(12) United States Patent
Yokokawa et al.

(10) Patent No.: US 9,804,472 B2
(45) Date of Patent: Oct. 31, 2017

(54) ELECTROPHORESIS DISPERSION LIQUID, ELECTROPHORESIS SHEET, ELECTROPHORESIS DEVICE, AND ELECTRONIC APPARATUS

(71) Applicant: Seiko Epson Corporation, Tokyo (JP)

(72) Inventors: Shinobu Yokokawa, Okaya (JP); Keiichi Inoue, Chino (JP); Tomoyuki Ushiyama, Chino (JP); Masahiko Nakazawa, Matsumoto (JP); Kiyoshi Nakamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/049,387

(22) Filed: Feb. 22, 2016

(65) Prior Publication Data

US 2016/0282696 A1    Sep. 29, 2016

(30) Foreign Application Priority Data

Mar. 27, 2015 (JP) .................................. 2015-067724

(51) Int. Cl.
| | | |
|---|---|---|
| *G02F 1/03* | (2006.01) | |
| *G02F 1/07* | (2006.01) | |
| *G09G 3/34* | (2006.01) | |
| *G02F 1/167* | (2006.01) | |
| *C09C 1/36* | (2006.01) | |
| *C08F 292/00* | (2006.01) | |

(52) U.S. Cl.
CPC ............ *G02F 1/167* (2013.01); *C08F 292/00* (2013.01); *C09C 1/3669* (2013.01); *C09C 1/3676* (2013.01); *C09C 1/3692* (2013.01); *G02F 2001/1678* (2013.01)

(58) Field of Classification Search
USPC ........ 359/242, 265–267, 270–273, 290–292, 359/295, 296, 298; 345/105–108
See application file for complete search history.

(56) References Cited

U.S. PATENT DOCUMENTS

| | | | |
|---|---|---|---|
| 2006/0245037 A1 | 11/2006 | Yamamoto et al. | |
| 2009/0109521 A1* | 4/2009 | Komatsu | G02F 1/167 359/296 |
| 2012/0190782 A1* | 7/2012 | Zhou | C09C 1/48 524/236 |

FOREIGN PATENT DOCUMENTS

JP        H5-173193 A        7/1993

OTHER PUBLICATIONS

European Search Report, issued in related Patent Application No. EP-16162309, dated Sep. 7, 2016.
Extended European Search Report, issued in related Patent Application No. EP-16162309, dated Apr. 26, 2017.

\* cited by examiner

*Primary Examiner* — Brandi Thomas
(74) *Attorney, Agent, or Firm* — ALG Intellectual Property, LLC

(57) ABSTRACT

An electrophoresis dispersion liquid includes first electrophoretic particle of a scattering system having an ionic group on a surface thereof; second electrophoretic particle of a coloring system having a polarization group on the surface thereof; and a dispersion medium. It is preferable that the ionic group is an acidic group, and further includes a ring structure that forms an acidic group and a salt. It is preferable that the polarization group is an organic group having a main skeleton, and a substituent bonded to the main skeleton.

19 Claims, 9 Drawing Sheets

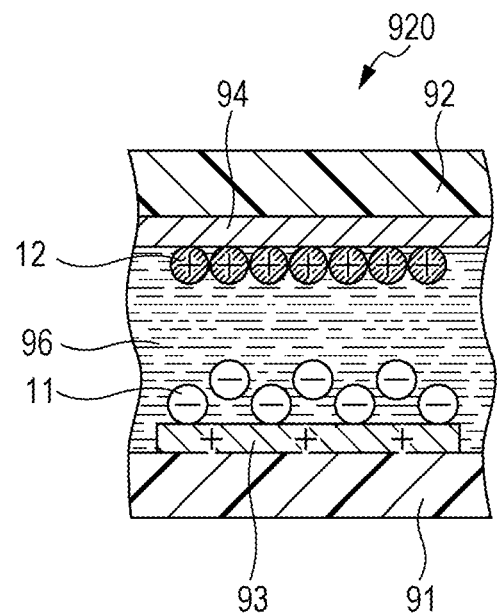
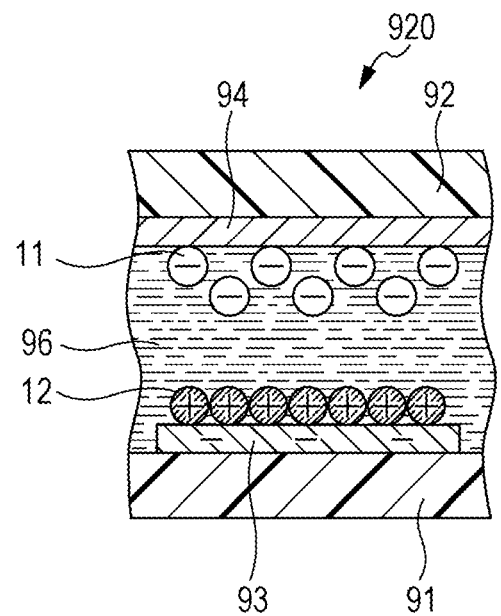

ELECTROPHORESIS DISPERSION LIQUID, ELECTROPHORESIS SHEET, ELECTROPHORESIS DEVICE, AND ELECTRONIC APPARATUS

BACKGROUND

1. Technical Field

The present invention relates to an electrophoresis dispersion liquid, and electrophoresis sheet, and electrophoresis device, and electronic apparatus.

2. Related Art

Generally, it is known that when a dispersion system in which fine particles are dispersed in a liquid is acted on by an electrical field, the fine particles are moved (migrate) in the liquid due to Coulomb force. This phenomenon is known as electrophoresis, and in recent years, electrophoresis display devices in which desired information (images) is displayed using electrophoresis have garnered attention as new display devices.

The electrophoresis display device has display memory properties in a state in which application of a voltage is stopped and wide viewing angle properties, and is capable of high contrast display with low power consumption.

Since electrophoresis display devices are non-light emitting display devices, electrophoresis display devices are better for the eyes compared to a light-emitting display device such as a cathode ray tube.

Such an electrophoresis display device provided with a dispersion in which the electrophoretic particles are dispersed in a solvent as an electrophoresis dispersion liquid arranged between a pair of substrates having electrodes is known.

In the electrophoresis dispersion liquid of this configuration, electrophoretic particles including particles with positive chargeability and particles with negative chargeability are used, and, in so doing, it is possible for desired information (image) to be displayed by applying a voltage between the pair of substrates (electrodes).

In the electrophoresis dispersion liquid including the positively charged and negatively charged electrophoretic particles, a method in which positive or negative chargeability is expressed by the electrophoretic particles is generally achieved by introducing an ion-derived substituent (ionic group) into the particles (for example, refer to JP-A-5-173193).

However, in the electrophoresis dispersion liquid with such a configuration, exchanging ion types in the electrophoresis dispersion liquid becomes complicated due to the addition of a dispersant in the electrophoresis dispersion liquid. Therefore, a problem arises where the charging state of the electrophoretic particles varies greatly and, as a result, the display characteristics of the electrophoresis display device become unstable due to the dispersion and aggregation state of the electrophoretic particles and temperature changes in the electrophoresis dispersion liquid.

SUMMARY

An advantage of some aspects of the invention is to provide an electrophoresis dispersion liquid including electrophoretic particles able to exhibit superior display characteristics in an electrophoresis device, a highly reliable electrophoresis sheet, electrophoresis device, and electronic apparatus using the electrophoresis dispersion liquid.

This advantage is achieved by the invention described below.

According to an aspect of the invention, there is provided an electrophoresis dispersion liquid including first electrophoretic particle of a scattering system having an ionic group on a surface thereof; second electrophoretic particle of a coloring system having a polarization group on the surface thereof; and a dispersion medium.

The electrophoresis device including the electrophoresis dispersion liquid with this configuration exhibits superior display characteristics.

In the electrophoresis dispersion liquid, it is preferable that the ionic group is an acidic group or a basic group.

In so doing, it is possible to make the ionic group reliably have negative or positive ionicity.

In the electrophoresis dispersion liquid, it is preferable that the ionic group is an acidic group and further includes a ring structure that forms an acidic group and a salt.

In so doing, during the manufacture of the electrophoretic particles, it is possible for the third monomer to have superior solubility in the solvent and be dissolved. Furthermore, in the electrophoresis dispersion liquid, it is possible for a portion of the ring structure to be isolated from the acidic group, and for the first electrophoretic particles to have superior dispersibility, caused thereby, and be dispersed in the electrophoresis dispersion liquid.

In the electrophoresis dispersion liquid, it is preferable that the first electrophoretic particle include scattering system particle having a first functional group on the surface thereof, and a first block copolymer bonded to the scattering system particle, and the first block copolymer is formed by a first monomer having a site that contributes to dispersibility in the dispersion medium, a second monomer having the second functional group which has reactivity to the first functional group, and a third monomer having an acidic group and a ring structure being polymerized without the first monomer and the second monomer being copolymerized, and is connected to the scattering system particles by reacting the first functional group and the second functional group at the unit derived from the second monomer.

In so doing, it is possible to form an electrophoretic particle including both uniform dispersion capacity and ionicity in the electrophoresis dispersion liquid.

In the electrophoresis dispersion liquid, it is preferable that the dispersion portion at which the first monomer is polymerized, the bonding portion at which the second monomer is polymerized, and the ionic portion at which the third monomer is polymerized are connected in the first block copolymer.

In so doing, it is possible to form an electrophoretic particle including both uniform dispersion capacity and ionicity in the electrophoresis dispersion liquid.

In the electrophoresis dispersion liquid, it is preferable that the weight average molecular weight of the dispersion portion is 10,000 or more to 100,000 or less.

In so doing, it is possible for the dispersibility of the electrophoretic particles in the electrophoresis dispersion liquid to be made superior.

In the electrophoresis dispersion liquid, it is preferable that the bonding portion is formed polymerizing 2 or more to 10 or less units of the second monomer.

In so doing, it is possible for a chemical bond to be formed between the bonding portion and the particle, and for the block polymer to be reliably connected to the particle.

In the electrophoresis dispersion liquid, it is preferable that the first monomer is a silicone macromonomer represented by the following general formula (I).

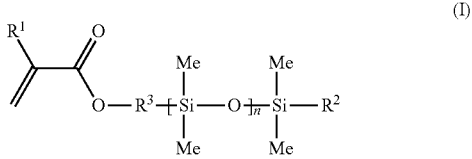

(I)

[in the formula, $R^1$ is a hydrogen atom or a methyl group, $R^2$ is a hydrogen atom or an alkyl group with 1 to 4 carbon atoms, $R^3$ is a structure including one type from an alkyl group with 1 to 6 carbon atoms and an ether group of ethylene oxide or a propylene oxide, and n is an integer of 0 or more]

In so doing, when using a medium with silicone oil as a main component as the dispersion medium included in the electrophoresis dispersion liquid, it is possible for the electrophoretic particles that include the dispersion portion obtained by polymerizing the monomer M1 to have superior dispersibility and be dispersed in the dispersion medium because the first monomer exhibits superior affinity with respect to the dispersion medium.

In the electrophoresis dispersion liquid, it is preferable that the molecular weight of the silicone macromonomer is 1,000 or more to 50,000 or less.

In so doing, it is possible for the electrophoretic particles provided with the dispersion portion by polymerizing the monomer M1 to have superior dispersibility and be dispersed in the dispersion medium.

In the electrophoresis dispersion liquid, it is preferable that the polarization group is an organic group having a main skeleton and a substituent bonded to the main skeleton.

By giving the polarization group this configuration, it is possible for the electrons to be unevenly distributed (polarized) in the main skeleton, and, in so doing, possible to control the polarized state (charging state) of the second electrophoretic particles.

In the electrophoresis dispersion liquid, it is preferable that the second electrophoretic particles include coloring system particle having a first functional group on the surface thereof, and a second block copolymer bonded to the coloring system particle, and the second block copolymer is formed by a first monomer having a site that contributes to dispersibility in the dispersion medium, a second monomer having the second functional group which has reactivity to the first functional group, and a fourth monomer having an organic group being polymerized without the first monomer and the second monomer being copolymerized, and is connected to the coloring system particle by reacting the first functional group and the second functional group at the unit derived from the second monomer.

In so doing, it is possible to form an electrophoretic particle including both uniform dispersion capacity and polarity in the electrophoresis dispersion liquid.

In the electrophoresis dispersion liquid, it is preferable that the dispersion portion at which the first monomer is polymerized, the bonding portion at which the second monomer is polymerized, and the polarization portion at which the fourth monomer is polymerized are connected in the second block copolymer.

In so doing, it is possible to form an electrophoretic particle including both uniform dispersion capacity and polarity in the electrophoresis dispersion liquid.

In the electrophoresis dispersion liquid, it is preferable that the dispersion medium is silicone oil.

Silicone oil has excellent weather resistance because of not having unsaturated bonds, and has the further advantage of high safety.

According to another aspect of the invention, there is provided an electrophoresis sheet, including a substrate; and a structure which is arranged above the substrate, and that accommodate the electrophoresis dispersion liquid according to each of the above aspects.

In so doing, a high performance and highly reliable electrophoresis sheet is obtained.

According to still another aspect of the invention, there is provided an electrophoresis device provided with the electrophoresis sheet of the above aspects.

In so doing, a high performance and highly reliable electrophoresis device is obtained.

According to still another aspect of the invention, there is provided an electronic apparatus including the electrophoresis device of the above aspects.

In so doing, a high performance and highly reliable electronic apparatus is obtained.

BRIEF DESCRIPTION OF THE DRAWINGS

The invention will be described with reference to the accompanying drawings, wherein like numbers reference like elements.

FIGS. 11A and 11B are schematic views showing an operation principle of the electrophoresis display device shown in FIG. 10.

DESCRIPTION OF EXEMPLARY EMBODIMENTS

Below, the method of manufacturing an electrophoresis dispersion liquid, the electrophoresis sheet, the electrophoresis device, and the electronic apparatus of the invention will be described in detail based on preferred embodiments shown in the attached drawings.

The electrophoresis dispersion liquid of the invention contains first electrophoretic particles in a scattering system having an ionic group on the surface thereof, second electrophoretic particles in a coloring system having a polarization group on the surface thereof, and a dispersion medium; however, first, the first and second electrophoretic particles contained in the electrophoresis dispersion liquid will each be described.

First and Second Electrophoretic Particles

First Embodiment

First Electrophoretic Particles

Although the first electrophoretic particles are scattering system electrophoretic particles having an ionic group on the surface thereof, in the embodiment, a configuration in which the block copolymer having an ionic group is connected to the scattering system particles (base particles) will be described as an example.

Figure 1:
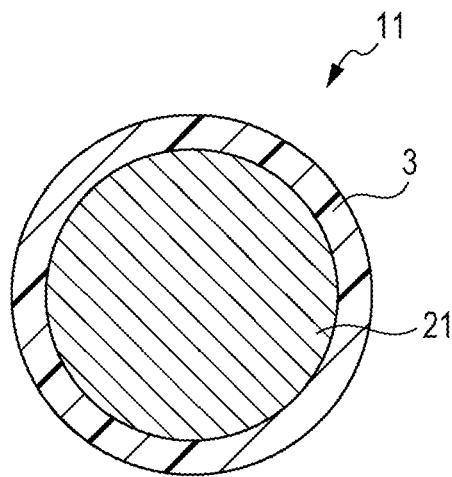
FIG. 1 is a longitudinal sectional view showing a first embodiment of first electrophoretic particles contained in an electrophoresis dispersion liquid of the invention.
Figure 2:
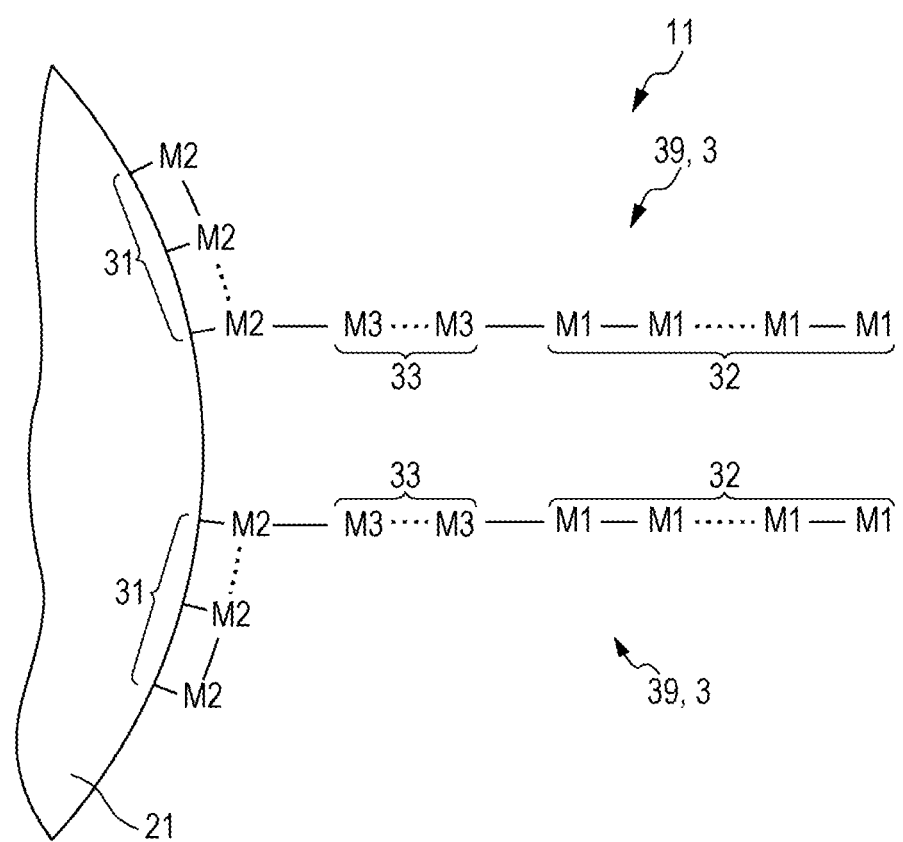
FIG. 2 is a schematic view of a block copolymer included in the first electrophoretic particles shown in FIG. 1.

FIG. 1 is a longitudinal sectional view showing the first embodiment of the first electrophoretic particles contained in the electrophoresis dispersion liquid of the invention, and FIG. 2 is a schematic view of the block copolymer included in the first electrophoretic particles shown in FIG. 1.

The first electrophoretic particles 11 (below, also referred to simply as "electrophoretic particles 11") include a scattering system particle (base particle) 21 and a coating layer 3 provided on the surface of the scattering system particles 21.

The scattering system particles 21 are particles in which recognition of the color of the electrophoretic particles 11 is created by scattering of light, and specifically, examples thereof include particles formed from white pigment particles mainly configured by a metal oxide with a preferable refractive index of 2 or more and more preferably 2.5 or more, without remarkable absorption in the visible light range at which the hue is apparent.

Although examples of the metal oxide include titanium dioxide, zirconium oxide, antimony trioxide, and silicon dioxide, and it is possible to use one type or a combination of two or more types thereof, among these, titanium dioxide is preferable. In so doing, the block copolymer 39 can be easily connected to the electrophoretic particles 11.

The scattering system particles 21 may be subjected to a coating treatment or the like by the surface thereof being coated with a resin material. Examples of the resin material include acrylic resins, urethane resins, urea resins, epoxy resins, polystyrene, and polyester, and it is possible to use one type or a combination of two or more types thereof.

Since the scattering system particles 21 include a metal oxide, a hydroxyl group able to bond (react) with the functional group included in the constituent unit derived from the second monomer M2 (below, also simply referred to as "monomer M2") included in bonding of the block copolymer 39 described later is included (exposed) on the surface thereof.

Although examples of the functional group having reactivity to the hydroxyl group includes an isocyanate group, an epoxy group, a glycidyl group, an oxetane group, and an alkoxysilyl group, among these, an alkoxysilyl group is preferable.

The scattering system particles 21 in which the hydroxyl group and the alkoxysilyl group are combined and monomer M2 are each comparatively easily prepared and it is possible for the monomer M2 (block copolymer, described later) to be strongly connected to the surface of the scattering system particles 21, and thus are preferable.

Below, a case where the functional group included in the monomer M2 is an alkoxysilyl group will be described as an example.

The scattering system particles 21 have at least a portion (in the configuration in the drawings, substantially the entirety) of the surface thereof coated by the coating layer 3.

The coating layer 3 is configured including a plurality of the first block copolymer 39 (below, also referred to simply as "polymer 39") (refer to FIG. 2).

In the embodiment, the first block copolymer 39 is formed by the first monomer M1 having a site (group) that contributes to dispersibility in the dispersion medium (below, also referred to simply as "monomer M1"), the second monomer M2 having a second functional group having reactivity with the first functional group (below, also referred to simply as "monomer M2"), an acidic group, and the third monomer M3 having a ring structure that forms an acidic group and a salt (below, also referred to simply as "monomer M3") being polymerized without the first monomer M1 and the second monomer M2 being copolymerized. In the unit derived from the monomer M2, the first block copolymer is connected to the particles by the first functional group and the second functional group reacting.

By giving the first block copolymer 39 this configuration, dispersibility is imparted by the unit derived from the monomer M1 (below, also referred to as a dispersion unit) the block copolymer is connected to the scattering system particles 21 by the unit derived from the monomer M2 (below, also referred to as a bonding unit), and the block copolymer is ionized by the unit derived from the monomer M3 (below, also referred to as an ionic unit). Therefore, the first electrophoretic particles 11 including the first block copolymer 39 with this configuration are able to exhibit a uniform dispersion capacity in the electrophoresis dispersion liquid.

In the embodiment, the first block copolymer 39 is a copolymer in which the dispersion portion 32 at which the first monomer M1 is polymerized, the ionic portion 33 at which the third monomer M is polymerized, and the bonding portion 31 at which the second monomer M2 is polymerized are connected in this order. In the first block copolymer 39 with this configuration, the dispersion portion 32 is formed by polymerizing the monomer M1, and a plurality of dispersion units derived from the monomer M1 is included, the ionic portion 33 is formed by polymerizing the monomer M3, and a plurality of the ionic units derived from the monomer M3 is included, the bonding portion 31 is formed by polymerizing the monomer M2, and a plurality of the bonding units derived from the monomer M2 is included. In the bonding portion 31 included in the block copolymer 39, the scattering system particles 21 and the first block copolymer 39 are chemically bonded by reacting the first functional group and the second functional group.

Below, the dispersion portion 32, the bonding portion 31 and the ionic portion 33 that configure the block copolymer 39 will be described.

The dispersion portion 32 is provided on the surface of the scattering system particles 21 in the coating layer 3 in order to impart dispersibility to the first electrophoretic particles 11 in the electrophoresis dispersion liquid, described later.

The dispersion portion 32 is connected to a plurality of dispersion units which are formed by polymerizing a plurality of the monomer M1 having a site that is a side-chain that contributes to dispersibility in the dispersion medium after polymerization in the electrophoresis dispersion liquid, and is derived from the monomer M1.

The monomer M1 includes one polymerizable group that is able to be polymerized by live radical polymerization (radical polymerization), and after further polymerization is a pendant-type monofunctional monomer that includes a site that is a non-ionic side-chain.

By using a monomer M1 that includes a non-ionic side-chain, the dispersion portion 32 formed by live radical polymerization exhibits superior affinity to the dispersion medium included in the electrophoresis dispersion liquid, described later. Therefore, the first electrophoretic particles 11 that include the dispersion portion 32 have superior dispersibility and are dispersed in the electrophoresis dispersion liquid without being aggregated.

Examples of the one polymerizable group included in the monomer M1 include those that include a carbon-carbon double bond, such as a vinyl group, a styryl group, and a (meth)acryloyl group.

Examples of the monomer M1 include vinyl monomers, vinyl ester monomers, vinyl amide monomers, (meth)acrylic monomers, (meth)acrylic ester monomers, (meth)acrylic amide monomers and styryl monomers, and more specifically, acrylic monomers such as 1-hexane, 1-heptane, 1-octane, methyl (meth)acrylate, ethyl (meth)acrylate, propyl (meth)acrylate, stearyl (meth)acrylate, lauryl (meth)acrylate, decyl (meth)acrylate, isooctyl (meth)acrylate, isobornyl (meth)acrylate, cyclohexyl (meth)acrylate, and pentafluoro (meth)acrylate, and silicone macromonomers represented by the following general formula (I) and styrene monomers such as such as styrene, 2-methyl styrene, 3-methyl styrene, 4-methyl styrene, 2-ethyl styrene, 3-ethyl styrene, 4-ethyl styrene, 2-propyl styrene, 3-propyl styrene, 4-propyl styrene, 2-isopropyl styrene, 3-isopropyl styrene, 4-isopropyl styrene, and 4-tert-butyl styrene, and it is possible to use one type or a combination of two or more types thereof.

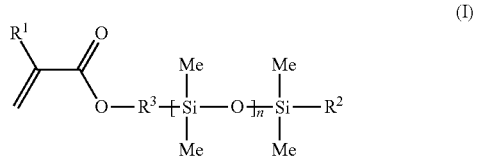

(I)

[in the formula, $R^1$ is a hydrogen atom or a methyl group, $R^2$ is a hydrogen atom or an alkyl group with 1 to 4 carbon atoms, $R^3$ is a structure including one type from an alkyl group with 1 to 6 carbon atoms and an ether group of ethylene oxide or a propylene oxide, and n is an integer of 0 or more]

Among these, it is preferable that the monomer M1 is a silicone macromonomer represented by the above general formula (I). The dispersion portion that is able to polymerize the monomer M1 exhibits superior dispersibility with respect to the non-polar dispersion medium. That is, although a medium having silicone oil as the main component is used as the dispersion medium included in the electrophoresis dispersion liquid, described later, even in a case of using a hydrocarbon-based solvent as in the silicone oil, superior affinity to the dispersion medium. Therefore, it is possible for the first electrophoretic particles 11 provided with the dispersion portion 32 obtained by polymerizing the monomer M1 to have superior dispersibility and be dispersed in the dispersion medium.

In a case of using the silicone macromonomer represented by the above general formula (I) as the monomer M1, it is preferable that the weight average molecular weight thereof is approximately 1,000 or more to 50,000 or less, approximately 3,000 or more to 30,000 or less is more preferable, and approximately 5,000 or more to 20,000 or less is still more preferable. In so doing, it is possible for the first electrophoretic particles 11 provided with the dispersion portion 32 obtained by polymerizing the monomer M1 to have superior dispersibility and be dispersed in the dispersion medium.

It is preferable that the weight average molecular weight of the dispersion portion 32 is 10,000 or more to 100,000 or less, and 10,000 or more to 60,000 or less is more preferable. In particular, in a case of using a silicone macromonomer such as represented by the general formula (I) as the or a case of using a hydrocarbon-based monomer as the monomer M1, it is preferable that the weight average molecular weight of the dispersion portion 32 is 8,000 or more to 50,000 or less and 10,000 or more to 35,000 or less is more preferable. In so doing, it is possible for the dispersibility of the first electrophoretic particles 11 in the electrophoresis dispersion liquid to be made superior.

In one polymer, it is preferable that the number of dispersion units included in the dispersion portion 32 is 1 or more to 20 or less, and 2 or more to 10 or less is more preferable. In so doing, it is possible for the dispersibility of the first electrophoretic particles 11 in the electrophoresis dispersion liquid to more reliably imparted.

It is preferable that the molecular weight distribution of the dispersion portion 32 is 1.2 or less, 1.1 or less is more preferable, and 1.05 or less is still more preferable.

The molecular weight distribution of the dispersion portion 32 represents the ratio (Mw/Mn) between the number average molecular weight (Mn) of the dispersion portion 32 and the weight average molecular weight (Mw) of the dispersion portion 32, and it can be said that the dispersion portions 32 exposed in the plurality of first electrophoretic particles 11 have a substantially uniform length by the molecular weight distribution of the dispersion portion 32 being within the above ranges. Therefore, each first electrophoretic particle 11 exhibits a uniform dispersion capability in the electrophoresis dispersion liquid. It is possible to measure number average molecular weight (Mn) and the weight average molecular weight (Mw) as a polystyrene conversion molecular weight using a gel permeation chromatography (GPC) method.

Furthermore, it is preferable for the dispersion portion 32 to have a molecular weight of the dispersion unit of the base end portion side connected to the bonding portion 31 lower than the molecular weight of the dispersion unit on the tip end side. More specifically, it is preferable that the molecular weight of the side chain included in the monomer M1 that is a precursor of the dispersion unit positioned on the base end portion side is lower than the molecular weight of the side-chain included in the monomer M1 that is a precursor of the dispersion unit positioned on the tip end side. In so doing, it is possible to make the dispersibility of the first electrophoretic particles 11 in the electrophoresis dispersion liquid superior and for the dispersion portion 32 to be highly densely bonded to the surface of the scattering system particles 21.

Changes in the molecular weight of the side-chain may continuously increase from the based end side towards the leading end side, or may increase step-wide from the base end side toward the leading end side.

The bonding portion 31 is bonded to the surface of the scattering system particles 21 in the coating layer 3 included in the first electrophoretic particles 11, and in so doing the polymer 39 is connected to the scattering system particles 21.

The bonding portion 31, in the invention, can form a common bond by the scattering system particle 21 and the hydroxyl group included on the surface thereof being bonded, and is formed by polymerizing a plurality of the second monomer M2 including the functional group, and a plurality of bonding units (constituent unit) derived from the monomer M2 are connected.

In this way, by using the polymer 39 including a plurality of bonding portions 31 each including the functional group, it is possible for the dispersibility of the first electrophoretic particles 11 to be made superior. That is, the polymer 39 not only includes a plurality of functional groups, but the plurality of functional groups are present concentrated at the bonding portion 31. Furthermore, because the bonding portion 31 is connected to a plurality of bonding units, the site capable of reacting with the scattering system particles 21 is large compared to a case where there is only one bonding unit. Therefore, it is possible for the polymer 39 to be reliably bonded to the surface of the scattering system particles 21 at the bonding portion 31 formed by polymerizing the plurality of monomers M2.

In the embodiment, as described above, the hydroxyl group is included on the surface of the scattering system particles 21, and the functional group included in the monomer M2 becomes an alkoxysilyl group. By making the combination of such a hydroxyl group and an alkoxysilyl group, since the reaction between the groups indicates superior reactivity, it is possible for the bond to the surface of the scattering system particle 21 to be more reliably formed at the bonding portion 31.

The monomer M2 includes one alkoxysilyl group represented by the following general formula (II) as the functional group, and further includes one polymerizable group so as to be able to be polymerized by live radical polymerization.

(II)

[in the formula, each R independently represents an alkyl group with 1 to 4 carbon atoms, and n represents an integer of 1 to 3.]

By using such a configuration as the monomer M2, it is possible to create the bonding portion 31 at which the monomer M2 is polymerized by live radical polymerization, and further the bonding portion 31 formed by live radical polymerization exhibits superior reactivity to the hydroxyl group positioned on the surface of the scattering system particles 21.

Examples of the one polymerizable group included in the monomer M2 include those that include a carbon-carbon double bond, such as a vinyl group, a styryl group, and a (meth)acryloyl group, similarly to the monomer M1.

Examples of the monomer M2 include vinyl monomers including one alkoxysilyl group represented by the above general formula (II), vinyl ester monomers, vinyl amide monomers, (meth)acrylic monomers, (meth) acrylic ester monomers, (meth) acrylic amide monomers, and styryl monomers, and more specifically include silane-based monomers containing silicon atoms such as 3-(meth) acryloxypropyltriethoxy(methoxy) silane, vinyl triethoxy (methoxy) silane, 4-vinyl butyl triethoxy (methoxy) silane, 8-vinyl octyltriethoxy (methoxy) silane, 10-methacryloyloxydecyl triethoxy (methoxy) silane, and 10-acryloyloxydecyl triethoxysilane (methoxy) silane, and it is possible to use one type or a combination of two or more types thereof.

In one polymer, it is preferable that the number of bonding units included in the bonding portion 31 is 2 or more to 10 or less, and 3 or more to 6 or less is more preferable. Because the bonding portion 31 has a low affinity to the dispersion medium compared to the dispersion portion 32 when the upper limit value is exceeded, there is concern of the dispersibility of the first electrophoretic particles 11 being lowered and of the bonding portions 31 locally bonding with each other according to the type of monomer M2. When lower than the lower limit value, it is difficult for bonding with the scattering system particles 21 to proceed sufficiently according to the type of monomer M2, and there is concern of the dispersibility of the first electrophoretic particles 11 being lowered caused by this difficulty.

It is possible for the number of bonding units included in the bonding portion 31 to be obtained by analysis using a general-purpose analyzer, such as NMR spectrum, IR spectrum, element analysis, gel permeation chromatography (GPC) or the like. Because the bonding portion 31, the dispersion portion 32, and the ionic portion 33 are macromolecular polymers in the polymer 39, both have a molecular weight distribution. Accordingly, although the results of the analysis as outlined above are not limited to corresponding to all of the polymers 39, it is possible for the reactivity between the polymer 39 and the scattering system particles 21 and the dispersibility and the electrophoretic properties (ionicity) of the first electrophoretic particles 11 to both be achieved as long as the number of bonding units obtained with at least the above methods is 2 to 8.

In the embodiment, the ionic portion 33 is a polymer formed by polymerizing a plurality of the third monomer M3 having an acidic group and a ring structure that forms an acidic group and a salt, and having negative ionicity and a plurality of ionic units derived from the monomer M3 is connected.

The ionic portion 33 with this configuration exhibits a function of imparting negative ionicity to the first electrophoretic particles 11 in the electrophoresis dispersion liquid by including the ionic units.

Accordingly, it is possible for the block copolymer 39 to reliably impart negative ionicity to the first electrophoretic particles 11 by including the ionic portion 33 in addition to the dispersion portion 32 and the bonding portion 31.

In particular, because the ionic portion 33 have a plurality of ionic units connected by the ionic portion 33 including a plurality of the ionic units that each have negative ionicity, it is possible to make the ionicity of the first electrophoretic particles 11 superior, compared to a case of including only one ionic unit. That is, in the electrophoresis dispersion liquid, described later, the first electrophoretic particles 11 that include the polymer 39 including the ionic portion 33 become electrophoretic particles that have superior negative ionicity (negative electrophoretic particles).

The monomer M3 is a monomer that includes an acidic group and a ring structure that forms an acidic group and a salt, as described above, includes one polymerizable group that is able to be polymerized by live radical polymerization (radical polymerization), and after further polymerization includes a pendant-type monofunctional monomer that includes a site that is side-chain with an acidic group and a ring structure that forms the acidic group and salt.

By the monomer M3 having the acidic group, it is possible for the ionic portion 33 to more reliably have negative ionicity. By having the ring structure, and the ring structure forming an acidic group and a salt, it is possible for the monomer M3 to have superior solubility in the solvent and be dissolved, in the method of manufacturing electrophoretic particles, described later. Furthermore, it is possible for a portion of the ring structure to be isolated from the acidic group, and for the first electrophoretic particles 11 to have superior dispersibility, caused thereby, and be dispersed in the electrophoresis dispersion liquid.

Although not particularly limited, examples of the acidic group include a carboxy group, a sulfonate group, a phosphate group, and an alkoxide group, and it is possible to use one type or a combination of two or more types thereof; however, among these, a carboxy group, a phosphate group and a sulfonate group are preferred. In so doing, it is possible to reliably form a salt between ring structures.

Among these, examples of the monofunctional monomer having a carboxy group or a sulfonate group include (meth) acrylic acid, 2-butenoic acid (crotonic acid), 3-pentenoic acid, 4-pentenoic acid, 4-methyl-4-pentenoic acid, 4-hexenoic acid, 5-hexenoic acid, 5-heptenoic acid, 6-heptenoic acid, 6-octenoic acid, 7-methyl-7-octenoic acid, 7-nonene acid, 8-nonene acid, 3-phenyl-2-propenoic acid (cinnamic acid), carboxymethyl (meth) acrylate, carboxyethyl (meth) acrylate, vinyl benzoic acid, vinyl phenyl acetate, maleic acid, fumaric acid, styrene sulfonate, vinyl toluene sulfonate, vinyl sulfonate, sulfomethyl (meth) acrylate, 2-propene-1-sulfonate, and 3-butene-1-sulfonate.

The ring structure (ionophore) forms an acidic group having a monofunctional monomer component and a salt in a state where metal ions, such as alkali metals such as Na and K or alkali earth metals such as Mg and Ca, are captured. It is possible for the dispersibility of the block copolymer 39 in the first electrophoretic particles 11 to be further improved and for the block copolymer 39 to be reliably negatively charged by the ring structure forming an acidic group and a salt.

Although preferable examples of the ionophore (ring structure) include those including at least one type from an oxygen atom, a nitrogen atom and a sulfur atom (that is, those in which the methylene groups are bonded to one another with an oxygen atom, a nitrogen atom, or a sulfur atom), and those including only a methylene group (hydrocarbon ring), those in which methylene groups are bonded to each other with an oxygen atom, a nitrogen atom, or a sulfur atom (hetero atom) are particularly preferable. It is preferable that the ionophore is a ring with an extremely high metal ion capturing capacity. This also has the advantage that the size of the ring (inside space), and the flexibility of the ring are easily adjusted, and it is possible to comparatively easily synthesize the ionophore.

Examples of the ionophore including such a hetero atom include a crown ether system, an azacrown system, a cryptand system, a sulfide system (thioether system) and a propylene glycol system.

Examples of the crown ether-based ionophore include 12-crown-4-ether, 2-hexyl-12-crown-4-ether, 2-octyl-12-crown-4-ether, 2-decyl-12-crown-4-ether, 2-dodecyl-12-crown-4-ether, 2-tetradecyl-12-crown-4-ether, 15-crown-5-ether, 2-butyl-15-crown-5-ether, 2-hexyl-15-crown-5-ether, 2-dodecyl-15-crown-5-ether, 2-tetradecyl-15-crown-5-ether, 18-crown-6 ether, 2-hexyl-18-crown-6 ether, 2-octyl-18-crown-6 ether, 2-tetradecyl-18-crown-6 ether, 2,3-dioctyl-18-crown-6 ether, 21-crown-7-ether, 2-decyl-21-crown-7-ether, 24-crown-8-ether, 2-decyl-24-crown-8-ether, and 2-dodecyl-24-crown-8-ether.

Examples of the azacrown system ionophore include 1,4,7-tri-propyl-1,4,7-triazacyclononane, 2-decyl-1,4,7-tripropyl-1,4,7-triazacyclononane, 1,4,7-tributyl-1,4,7-triazacyclononane, 1, 4, 7, 10-tetraoctyl-1,4,7,10-tetraazacyclododecane, 1,4,7,10-tetra (decyl)-1,4,7,10-tetraazacyclododecane, 1,4,7,10-tetra (dodecyl)-1,4,7,10-tetraazacyclododecane, 1,4,7,10-tetra (hexadecyl)-1,4,7,10-tetraazacyclododecane, 1,4,7,10,13-pentaoctyl-1,4,7,10,13-penta-aza cyclopentadecane, 1,4,7,10,13-penta (decyl)-1,4,7,10,13-penta-aza cyclopentadecane, 1,4,7,10,13,16-hexa (decyl)-1,4,7,10,13,16-hexa azacycloalkyl octadecane, 1,4,7,10,13,16-hexa (tetradecyl)-1,4,7,10,13,16-hexa azacycloalkyl octadecane, and 1,4,7,10,13,16-hexa (hexadecyl)-1,4,7,10,13,16-hexa-aza-cyclo-octadecane.

Examples of the cryptand system ionophore include 4,10,15-trioxa-1,7-diazabicyclo [5.5.5] heptadecane, 3-tetradecyl-4,10,15-trioxa-1,7-diazabicyclo [5.5.5] heptadecane, 4,7,13,18-tetraoxa-1,10-diazabicyclo [8.5.5] eicosane, 5-decyl-4,7,13,16,21-pentaoxa-1, 10-diazabicyclo [8.8.5] tricosane, 4,7,13,16,21,24 hexaoxa-1,10-diazabicyclo [8.8.8] hexacosane, 5-tetradecyl-4,7,13,16,21,24-hexaoxa-1,10-diazabicyclo [8.8.8] hexacosane, and 4,7,10,16,19,24,27-heptaoxa-1,13-diazabicyclo [11.8.8] nonacosane.

In one polymer, it is preferable that the number of ionic units included in the ionic portion 33 is 1 or more to 8 or less, and 2 or more to 5 or less is more preferable. Because the ionic portion 33 has a low affinity to the dispersion medium compared to the dispersion portion 32 when the upper limit value is exceeded, there is concern of the dispersibility of the first electrophoretic particles 11 being lowered according to the type of monomer M3. When lower than the lower limit value, it is difficult for the first electrophoretic particles 11 to be sufficiently charged according to the type of monomer M3, and there is concern of the electrophoretic properties of the first electrophoretic particles 11 being lowered caused by this difficulty.

It is possible for the number of ionic units included in the ionic portion 33 to be obtained by analysis using a general-purpose analyzer, such as NMR spectrum, IR spectrum, element analysis, gel permeation chromatography (GPC) or the like. As described above, because the bonding portion 31, the dispersion portion 32, and the ionic portion 33 are macromolecular polymers in the polymer 39, both have a molecular weight distribution. Accordingly, although the results of the analysis as outlined above are not limited to corresponding to all of the polymers 39, it is possible for the reactivity between the polymer 39 and the scattering system particles 21 and the dispersibility and the electrophoretic properties (ionicity) of the first electrophoretic particles 11 to both be achieved as long as the number of ionic units obtained with at least the above methods is 1 to 8.

In the embodiment, although a case is described of the ionic portion 33 having an acidic group and a ring structure that forms an acidic group and a salt, the ionic portion 33 is not limited thereto, and the acidic group may be independently present without the ring structure, or a basic group such as an amino group may be present instead of the acidic group. It is possible for the ionic portion 33 to exhibit positive ionicity by the ionic portion 33 having a basic group.

The polymer 39 is a triblock copolymer which the bonding portion 31, the dispersion portion 32 and the ionic portion 33 are each separately provided. Therefore, because it is possible to independently impart each of bondability with respect to the scattering system particles 21, dispersibility of the first electrophoretic particles 11 and ionicity (electrophoretic properties) of the first electrophoretic particles 11 to the polymer 39, the first electrophoretic particles 11 exhibit superior dispersibility and ionicity.

The polymer 39 is obtained by the manufacturing method described later. When reversible addition-fragmentation chain-transfer polymerization (RAFT), described later, is used, it is possible to obtain a comparatively uniform polymer. Accordingly, if polymerization is performed by adding 2 to 8 mol equivalent of the monomer M2 with respect to the chain transfer agent, it is possible for the number of bonding units in the bonding portion 31 to be set to the above range, and if polymerization is performed by adding 1 to 8 mol equivalent of the monomer M3 with respect to the chain transfer agent, it is possible for the number of ionic units in the ionic portion 33 to be set to the above range.

In so doing, it is possible for the effects due to the first electrophoretic particles 11 having a configuration including the polymer 39 to be reliably exhibited, the first electrophoretic particles 11 have superior dispersibility and electrophoretic properties (ionicity) in the electrophoresis dispersion liquid.

As outlined above, it is possible to manufacture the first electrophoretic particles 11 of the embodiment in which the first block copolymer 39 having the bonding portion 31, the dispersion portion 32 and the ionic portion 33 are connected to the surface of the scattering system particles 21 at the bonding portion 31 in the following manner.

Method of Manufacturing First Electrophoretic Particles

The method of manufacturing the first electrophoretic particles 11 includes a first step of obtaining a block copolymer 39 by the monomer M1, the monomer M2, and the monomer M3 being polymerized by living polymerization without the monomer M1 and the monomer M2 copolymerizing, and a second step of forming a coating layer 3 in which the plurality of block copolymers 39 are connected to the scattering system particles 21 by the first functional group included in the scattering system particles 21 and the second functional group included in the monomer M2 being reacted.

In the embodiment, a case of obtaining a plurality of block copolymers 39 in which the bonding portion 31, the ionic portion 33 and the dispersion portion 32 are connected in this order in the first step will be described.

In the first step, although 1) the ionic portion 33 in which the third monomer M3 having the third functional group is polymerized may be formed after the dispersion portion 32 in which the first monomer M1 is polymerized is formed by living radical polymerization using a polymerization initiator, and thereafter the bonding portion 31 in which the second monomer M2 having the second functional group is polymerized may be formed or 2) the bonding portion 31, the ionic portion 33, and the dispersion portion 32 may be formed in this order, here, a case were the plurality of block copolymers 39 is formed with the method in 1) will be described.

Below, each step will be described in detail.

[1] First, the plurality of block copolymers 39 in which the dispersion portion 32, the ionic portion 33 and the bonding portion 31 are connected is formed (first step).

[1-1] First, the dispersion portion 32 in which the first monomer M1 is polymerized by living polymerization using a polymerization initiator is formed.

Although example of the living polymerization method include living radical polymerization, living cationic polymerization, or living anionic polymerization, among these, living radical polymerization is preferable. It is possible for a reaction liquid or the like in which the reaction system is generated to be simply used by performing living radical polymerization, and further, it is possible for the monomer M1 to be polymerized with good control of the reaction.

According to the living radical polymerization, it is possible for the molecular weight distribution in the dispersion portion 32 to be easily set to 1.2 or less, and as a result, it is possible for the obtained first electrophoretic particles 11 to exhibit a uniform dispersion capacity in the electrophoresis dispersion liquid.

Although examples of the living radical polymerization method include atom transfer radical polymerization (ATRP), nitroxide-mediated radical polymerization (NMP), telluride-mediated polymerization (TERP), and reversible addition-fragmentation chain-transfer polymerization (RAFT), among these, reversible addition-fragmentation chain-transfer polymerization (RAFT) is preferable. According to the reversible addition-fragmentation chain-transfer polymerization (RAFT), it is possible for the polymerization to be caused to proceed simply during polymerization of the monomer M1 without using a metal catalyst and without concern of metal contamination. It is possible to set the molecular weight distribution in the dispersion portion 32 to be easily set to 1.2 or less.

Although not particularly limited, examples of the polymerization initiator (radical polymerization initiator) include azo initiators such as 2,2'-azobisisobutyronitrile (AIBN), 2,2'-azobis (4-methoxy-2,4-dimethyl valeronitrile), 2,2'-azobis (2,4-dimethyl valeronitrile), dimethyl 2,2'-azobis (2-methylpropionate), 1,1'-azobis (cyclohexane-1-carbonitrile), 2,2'-azobis [2-(2-imidazolin-2-yl) propane] dihydrochloride, and 2,2'-azobis [2-(2-imidazolin-2-yl) propane], and persulfate salts such as potassium persulfate, and ammonium persulfate.

In a case of using the reversible addition-fragmentation chain-transfer polymerization (RAFT), a chain transfer agent (RAFT agent) is used in addition to the polymerization initiator. Although not particularly limited, examples of the chain transfer agent include sulfur compounds having a functional group such as dithioester groups, trithiocarbamate groups xanthate groups, and dithiocarbamate groups.

Specifically, examples of the chain transfer agent include compounds represented by the following chemical formulae (1) to (7), and it is possible to use one type or a combination of two or more types thereof. These compounds are preferably used in light of being comparatively easily obtained and the reaction being easily controlled.

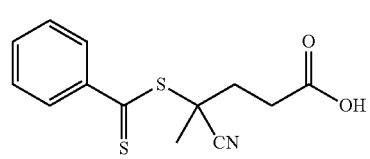

(1)

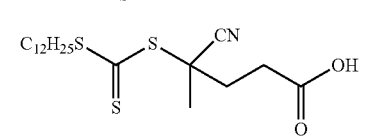

(2)

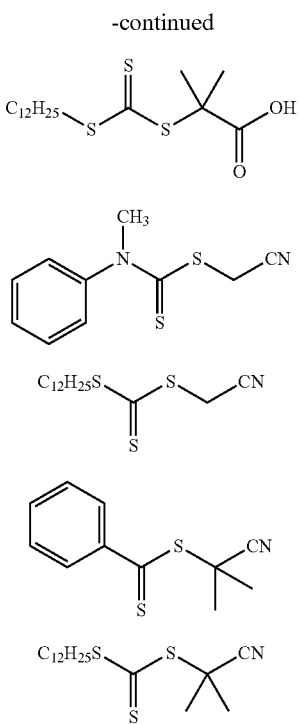

Among these, it is preferable that the chain transfer agent is a 2-cyano-2-propylbenzathioate represented by the above chemical formula (6). In so doing, it is possible for control of the reaction to be more easily performed.

In a case of using reversible addition-fragmentation chain-transfer polymerization (RAFT), although the ratio of the monomer M1, the polymerization initiator, and the chain transfer agent are determined, as appropriate, in consideration of the polymerization rate of the dispersion portion 32 to be formed or the reactivity of the compound such as the monomer M1, it is preferable that the mol ratio thereof is monomer:polymerization initiator:chain transfer agent=500 to 5:5 to 0.25:1. In so doing, it is possible to set the length (polymerization rate) of the dispersion portion 32 obtained by polymerizing the monomer M1 to a suitable magnitude, and possible to highly efficiently generate the dispersion portion 32 with the molecular weight distribution easily set to 1.2 or less.

Examples of the solvent for preparing the solution in which the monomer M1 is polymerized by living radical polymerization include water, alcohols such as methanol, ethanol, and butanol, hydrocarbons, such as hexane, octane, benzene, toluene, and xylene, ethers such as diethyl ether, and tetrahydrofuran, and esters such as ethyl acetate, and halogenized aromatic hydrocarbons such as chlorobenzene and o-dichlorobenzene, and it is possible for these to be used independently or as a mixed solvent.

It is preferable that the solution (reaction liquid) is subjected to a deoxidation treatment before initiating the polymerization reaction. Examples of the deoxidation treatment include a conversion or purging treatment after vacuum degassing with an inert gas such as argon gas or nitrogen gas.

It is possible to quickly and reliably perform polymerization reaction of the monomer by heating (temperature increase) the temperature of the solution to a predetermined temperature during the polymerization reaction of the monomer M1.

Although the heating temperature is not particularly limited and differs slightly according to the type and the like of the monomer M1, approximately 30° C. to 100° C. is preferable. It is preferable that the heating time (reaction time) is approximately 5 to 48 hours in a case where the heating temperature is in the above range.

When using the reversible addition-fragmentation chain-transfer polymerization (RAFT), fragments of the chain transfer agent used are present at one terminal (tip portion) of the dispersion portion 32. In the next step [1-2], the dispersion portion 32 including the fragments acts as a chain transfer agent during the reaction in which the ionic portion 33 is polymerized with the dispersion portion 32.

[1-2] Next, the ionic portion 33 in which the third monomer M3 that is negatively charged is polymerized is formed so as to be connected to the dispersion portion 32.

In so doing, a diblock copolymer in which the dispersion portion 32 and the ionic portion 33 are connected is generated.

In step [1-2], a purification treatment (removal treatment) that removes impurities such as unreacted monomer M1, solvent or polymerization initiator used in the step [1-1], and isolates and purifies the dispersion portion 32 may be performed, as necessary, before forming the ionic portion 33 using the monomer M2. In so doing, it is possible for the polymer 39 obtained in the following step [1-3] to be more uniform and highly pure. The purification treatment is not particularly limited, and examples thereof include a column chromatography method, a recrystallization method, and a re-precipitation method, and it is possible to perform one type or a combination of two or more types thereof.

As described above, when using the reversible addition-fragmentation chain-transfer polymerization (RAFT), fragments of the chain transfer agent used are present at one terminal of the dispersion portion 32. Therefore, the ionic portion 33 with this configuration is formed by preparing the solution containing the dispersion portion 32 obtained with the step [1-1] completed, the monomer M3, and the polymerization initiator, and again performing living polymerization initiator in the solution.

It is possible for the same solvents exemplified in the step [1-1] to be used as the solvent used in this step, and it is possible for the conditions when the monomer M3 is polymerized in the solution to be the same as the those exemplified as the conditions when the monomer M1 is polymerized in the solution in the step [1-1].

When using the reversible addition-fragmentation chain-transfer polymerization (RAFT), fragments of the chain transfer agent used are present at one terminal (tip portion) of the ionic portion 33. In the next step [1-3], the ionic portion 33 including the fragments acts as a chain transfer agent during the reaction in which the bonding portion 31 is polymerized with the ionic portion 33.

[1-3] Next, the bonding portion 31 at which the second monomer M2 including the second functional group which has reactivity with the first functional group included in the scattering system particles 21 is polymerized is formed so as to be connected to the ionic portion 33 including the diblock copolymer in which the dispersion portion 32 and the ionic portion 33 are connected.

In so doing, the first block copolymer 39 configured by a triblock copolymer in which the dispersion portion 32, the ionic portion 33 and the bonding portion 31 are connected in this order is generated.

In step [1-3], a purification treatment (removal treatment) that removes impurities such as unreacted monomer M3, solvent or polymerization initiator used in the step [1-2], and isolates and purifies the diblock copolymer in which the dispersion portion 32 and the ionic portion 33 are connected may be performed, as necessary, before forming the bonding portion 31 using the monomer M2. In so doing, it is possible for the polymer 39 obtained in the step [1-3] to be more uniform and highly pure. The purification treatment is not particularly limited, and examples thereof include a column chromatography method, a recrystallization method, and a re-precipitation method, and it is possible to perform one type or a combination of two or more types thereof.

When using the reversible addition-fragmentation chain-transfer polymerization (RAFT) as described above, fragments of the chain transfer agent used are present at one terminal (tip portion) of the ionic portion 33. Therefore, the bonding portion 31 with this configuration is formed by preparing the solution containing, the ionic portion 33 included in the diblock copolymer in which the dispersion portion 32 obtained with the step (1-2) completed and the ionic portion 33 are connected, the monomer M2, and the polymerization initiator, and again performing living polymerization initiator in the solution.

It is possible for the same solvents exemplified in the step [1-1] to be used as the solvent used in this step, and it is possible for the conditions when the monomer M2 is polymerized in the solution to be the same as the those exemplified as the conditions when the monomer M1 is polymerized in the solution in the step [1-1].

[2] Next, the plurality of first block copolymers 39 is connected to the scattering system particles 21 by the first functional group included in the scattering system particles 21 and the plurality of second functional groups included in the bonding portion 31 being reacted and a chemical bond being formed therebetween (second step).

In so doing, first electrophoretic particles 11 in which at least a portion of the scattering system particle 21 is coated with the coating layer 3 are obtained. Examples of such a process include a dry method and a wet method shown below.

Dry Method

In the dry method, first, a solution is prepared by mixing the polymer 39 and the scattering system particles 21 in a suitable solvent. Minute amounts of water, an acid or a base may be added to the solution, as necessary, in order to promote the hydrolysis of the alkoxysilyl group included in the polymer 39. Heating, light radiation or the like may be performed, as necessary.

At this time, it is preferable that the volume of the solvent is approximately 1 vol % or more to the volume of the scattering system particles 21 to approximately 20 vol % or less, and approximately 5 vol % or more to approximately 10 vol % or less is more preferable. In so doing, because it is possible for the chance of the polymer 39 contacting the scattering system particles 21 to be increased, it is possible for the bonding portion 31 to be more reliably bonded to the surface of the scattering system particles 21.

Next, after the polymer 39 is highly efficiently adsorbed to the surface of the scattering system particles 21 by dispersing with ultrasound wave radiation or stirring using a ball mill or a bead mill, or the like, the solvent is removed.

Next, the first electrophoretic particles 11 are obtained by a chemical bond with the hydroxyl group exposed on the surface of the scattering system particles 21 being formed by decomposing the alkoxysilyl group while heating the powder obtained by removing the solvent in preferable conditions of 100° C. to 200° C. for an hour or more.

Next, the excess polymer 39 adsorbed to the surface of the scattering system particles 21 without forming a chemical bond is removed by cleaning again several times in the solution while using a centrifuge.

It is possible to obtain purified first electrophoretic particles 11 by passing through the above steps.

Wet Method

In the wet method, first, a solution is prepared by mixing the polymer 39 and the scattering system particles 21 in a suitable solvent. Minute amounts of water, an acid or a base may be added to the solution, as necessary, in order to promote the hydrolysis of the alkoxysilyl group included in the polymer 39. Heating, light radiation or the like may be performed, as necessary.

At this time, it is preferable that the volume of the solvent is approximately 1 vol % or more to the volume of the scattering system particles 21 to approximately 20 vol % or less, and approximately 5 vol % or more to approximately 10 vol % or less is more preferable. In so doing, because it is possible for the chance of the polymer 39 contacting the scattering system particles 21 to be increased, it is possible for the bonding portion 31 to be more reliably bonded to the surface of the scattering system particles 21.

Next, after the polymer 39 is highly efficiently adsorbed to the surface of the scattering system particles 21 by dispersing with ultrasound wave radiation or stirring using a ball mill or a bead mill, or the like, the first electrophoretic particles 11 are obtained by a chemical bond with the hydroxyl group exposed on the surface of the scattering system particles 21 being formed by decomposing the alkoxysilyl group while heating the solvent in this state in preferable conditions of 100° C. to 200° C. for one hour or more.

Next, the excess polymer 39 adsorbed to the surface of the scattering system particles 21 without forming a chemical bond is removed by cleaning again several times in the solution while using a centrifuge.

It is possible to obtain purified first electrophoretic particles 11 by passing through the above steps.

There are cases of not being dispersed in the dispersion solvent when the first electrophoretic particles 11 are dried according to the type of the monomer M1 included in the polymer 39. In such a case, it is preferable convert the reaction solvent to the dispersion solvent a little at a time (not passing through the drying step) with a solvent conversion method during the cleaning task.

It is possible to use the aliphatic hydrocarbons (liquid paraffin) and the silicone oil, or the like exemplified as the dispersion liquid included in the electrophoresis dispersion liquid, described later, in addition to being able to use the same one exemplified in the step [1-1] as the solvent used in this step.

In the embodiment, although a configuration in which the first electrophoretic particles are obtained by connecting the block copolymer including an ionic group to the scattering system particles is described, there is no limitation thereto, and the first electrophoretic particles may be configured with a coupling agent having an ionic group connected to the scattering system particles.

Second Electrophoretic Particles

Next, the second electrophoretic particles will be described. Although the second electrophoretic particles are coloring system electrophoretic particles having a polarization group on the surface thereof, in the embodiment, a configuration in which the block copolymer having a polarization group is connected to the coloring system particles will be described as an example.

Figure 3:
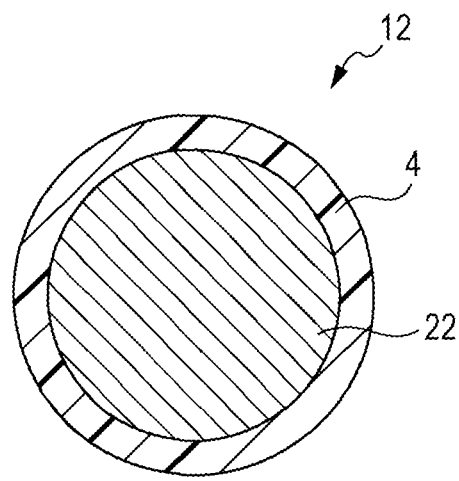
FIG. 3 is a longitudinal sectional view showing the first embodiment of second electrophoretic particles contained in the electrophoresis dispersion liquid of the invention.
Figure 4:
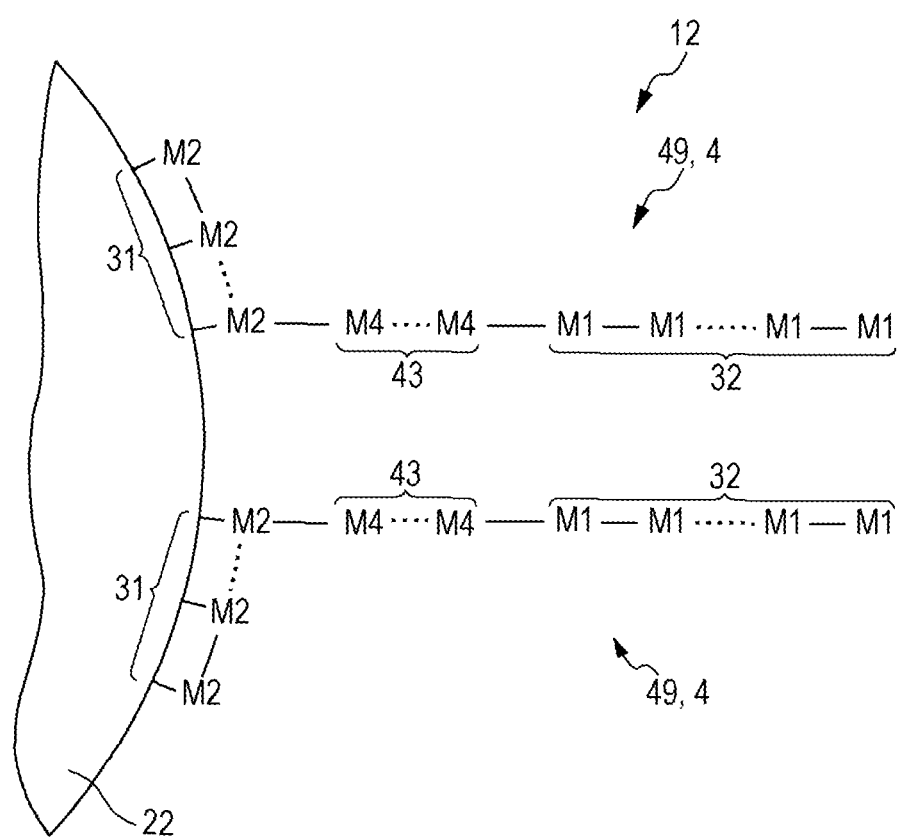
FIG. 4 is a schematic view of a block copolymer included in the second electrophoretic particles shown in FIG. 3.

FIG. 3 is a longitudinal sectional view showing the first embodiment of the second electrophoretic particles contained in the electrophoresis dispersion liquid of the invention, FIG. 4 is a schematic view of the block copolymer included in the second electrophoretic particles shown in FIG. 3, and FIGS. 5A to 5F are views for describing the polarization group included in the polarization unit included in the block copolymer shown in FIG. 4.

The second electrophoretic particles 12 (below, also referred to simply as "electrophoretic particles 12") include a coloring system particles (base particle) 22 and a coating layer 4 provided on the surface of the coloring system particles 22.

The coloring system particles 22 are particles in which the recognition of the color of the electrophoretic particles 12 is created by the color with which the particles are colored, and examples include particles formed from a color pigment particles.

Examples of the colored pigment include black pigments such as aniline black, carbon black, and titanium black, azo pigments such as monoazo, diazo, and polyazo, yellow pigments such as isoindolinone, chrome yellow, yellow iron oxide, cadmium yellow, titanium yellow, and antimony, red pigments such as quinacridone red, and chrome vermilion, blue pigments such as phthalocyanine blue, indanthrene blue, prussian blue, ultramarine, and cobalt blue, and green pigments such as phthalocyanine green, and it is possible to use one type or a combination of two or more types thereof.

The coloring system particles 22 may be subjected to a coating treatment or the like by the surface thereof being coated with a resin material. Examples of the resin material include acrylic resins, urethane resins, urea resins, epoxy resins, polystyrene, and polyester, and it is possible to use one type or a combination of two or more types thereof.

It is possible to set the color of the second electrophoretic particles 12 to a desired color by selecting, as appropriate, the type of pigment particles used as the coloring system particles 22, and the resin material used in the coating.

It is necessary that the coloring system particles 22 include (exposed) a first functional group that is able to bond (react) to the second functional group including the monomer M2 included in the bonding portion 31 of the polymer 49 described later on the surface thereof. However, because there are cases where a functional group is not included according to the type of pigment particles and resin particles, in this case, the particles may be subjected in advance to a functional group introduction process such as acid treatment, basic treatment, UV treatment, ozone treatment, and plasma treatment, and the first functional group introduced to the surface of the coloring system particles 22.

The combination of the first functional group included on the surface of the coloring system particles 22 and the second functional group included in the monomer M2, is not particularly limited as long as they can react with one another to be connected, and examples thereof include a combination of an isocyanate group and a hydroxyl group or an amino group, a combination of an epoxy group, a glycidyl group or an oxetane group and a carboxyl group, an amino group, a thiol group, a hydroxyl group, or an imidazole group, a combination of an amino group and a halogen group such as Cl, Br, and I, and a combination of an alkoxysilyl group and a hydroxyl group or an alkoxysilyl group; however, among these, a combination where the first functional group is a hydroxyl group and the second functional group is an alkoxysilyl group is preferable.

The combined coloring system particles 22 and monomer M2 is preferably used since it is possible for each to be comparatively easily prepared and for the monomer M2 (block copolymer, described later) to be strongly connected to the surface of the coloring system particles 22.

Here, an example of a combination in which the first functional group included on the surface of the coloring system particles 22 and the second functional group included in the monomer M2 is an alkoxysilyl group will be described.

The coloring system particles 22 have at least a portion (in the configuration in the drawings, substantially the entirety) of the surface thereof coated by the coating layer 4.

The coating layer 4 is configured including a plurality of the second block copolymer 49 (below, also referred to simply as "polymer 49") (refer to FIG. 4).

In the embodiment, the second block copolymer 49 is formed by the monomer M1 having a site (group) that contributes to dispersibility in the dispersion medium, the monomer M2 having a second functional group having reactivity with the first functional group (below, also referred to simply as "monomer M2"), a main skeleton, and the fourth monomer M4 including an organic group having a substituent bonded to the main skeleton (below, also referred to simply as "monomer M4") being polymerized without the first monomer M1 and the second monomer M2 being copolymerized. In the unit derived from the monomer M2, the first block copolymer is connected to the particles by the first functional group and the second functional group reacting.

By giving the second block copolymer 49 this configuration, dispersibility is imparted by the unit derived from the monomer M1 (below, also referred to as a dispersion unit), the block copolymer is connected to the coloring system particles 22 by the unit derived from the monomer M2 (below, also referred to as a bonding unit), and the block copolymer is polarized by the unit derived from the monomer M4 (below, also referred to as a polarization unit). Therefore, the second electrophoretic particles 12 including the second block copolymer 49 with this configuration are able to exhibit a uniform dispersion capacity and polarity in the electrophoresis dispersion liquid.

In the embodiment, the second block copolymer 49 is a copolymer in which the dispersion portion 32 at which the first monomer M1 is polymerized, the polarization portion 43 at which the fourth monomer M4 is polymerized, and the bonding portion 31 at which the second monomer M2 is polymerized are connected in this order. In the second block copolymer 49 with this configuration, the dispersion portion 32 is formed by polymerizing the monomer M1, and a plurality of dispersion units derived from the monomer M1 is included, the polarization portion 43 is formed by polymerizing the monomer M4, and a plurality of the polarization units derived from the monomer M4 is included, the bonding portion 31 is formed by polymerizing the monomer M2, and a plurality of the bonding units derived from the monomer M2 is included. In the bonding portion 31 included in the block copolymer 49, the coloring system particles 22 and the second block copolymer 49 are chemically bonded by reacting the first functional group and the second functional group.

Below, the dispersion portion 32, the bonding portion 31 and the polarization portion 43 that configure the block copolymer 49 will be described.

The dispersion portion 32 is provided on the surface of the coloring system particles 22 in the coating layer 4 in order to impart dispersibility to the second electrophoretic particles 12 in the electrophoresis dispersion liquid, described later.

The dispersion portion 32 is formed with a similar configuration to the above-described dispersion portion 32 having the block copolymer 39 included in the first electrophoretic particles 11, and is formed by polymerizing a plurality of the monomer M1 having a site that is a side-chain that contributes to dispersibility in the dispersion medium after polymerization in the electrophoresis dispersion liquid, and has a plurality of dispersion units derived from the monomer M1 connected.

The bonding portion 31 is bonded to the surface of the coloring system particles 22 in the coating layer 4 included in the second electrophoretic particles 12, and in so doing the polymer 49 is connected to the coloring system particles 22.

The bonding portion 31, is formed with the same configuration as the above-described bonding portion 31 having the block copolymer 39 included in the first electrophoretic particles 11, can form a common bond by the coloring system particles 22 and the hydroxyl group included on the surface thereof being reacted to be bonded, and is formed by polymerizing a plurality of the second monomer M2 including the functional group, and a plurality of bonding units (constituent unit) derived from the monomer M2 are connected.

In the embodiment, the polarization portion 43 is a polymer including a main skeleton and an organic group having a substituent bonded to the main skeleton, and formed by polymerizing a plurality of the fourth monomer M4 having negative or positive polarization group, and a plurality of polarization units derived from the monomer M4 connected.

The polarization portion 43 with this configuration exhibits a function of imparting negative or positive polarity to the second electrophoretic particles 12 in the electrophoresis dispersion liquid because the electrons in the polarization unit are unevenly distributed (polarized) by including the polarization unit.

Accordingly, it is possible for the block copolymer 49 to reliably impart negative or negative polarity (chargeability) to the second electrophoretic particles 12 by including the polarization portion 43 in addition to the dispersion portion 32 and the bonding portion 31.

In particular, because the polarization portion 43 has a plurality of polarization units connected by the polarization portion 43 including a plurality of the polarization units that each have negative or positive polarity, it is possible to make the polarity of the second electrophoretic particles 12 superior, compared to a case of including only one polarization unit. That is, in the electrophoresis dispersion liquid, described later, the second electrophoretic particles 12 that include the polymer 49 including the polarization portion 43 become electrophoretic particles (electrophoretic particles) that have superior polarity.

The monomer M4 is a monomer that includes, a polarization group, a main skeleton and an organic group including a substituent bonded to the main skeleton, as described above, includes one polymerizable group that is able to be polymerized by live radical polymerization (radical polymerization), and after further polymerization is a pendant-type monofunctional monomer that includes a site that is side-chain including the organic group.

In the polarization group included in the monomer M4, by setting at least one condition of the type of substituent (either or both of an electron withdrawing group and an electron donating group), number of bonds with respect to the main skeleton, and the binding site, the electrons in the main skeleton are biased (polarization), and in so doing, the polarization state (charging state) of the second electrophoretic particles 12 is controlled.

That is, on the end portion (below, referred to "terminal of the main skeleton") side of the opposite side to the polymerizable group of the main skeleton, the electrons are biased further toward the terminal end side than to the polymerizable group side of the main skeleton in the polarization group in which the electron withdrawing group (electron withdrawing group) as a substituent. When such a polarization group is introduced, the second electrophoretic particles 12 are negatively charged.

Meanwhile, on the polymerizable group side of the main skeleton, the electrons are biased further to the polymerizable groups side than the terminal side of the main skeleton in the polarization group in which the electron withdrawing group is bonded as a substituent. When such a polarization group is introduced, the second electrophoretic particles 12 positively charged.

In the polarization group to which an electron donating group (electron donor group) is bonded as a substituent, because a bias arises in the opposite electron concentration to the above-described, when the polarization group in which the electron donor group is bonded to the terminal side of the main skeleton, the second electrophoretic particles 12 are positively charged, and when the polarization group to which the electron donor group is bonded to the polymerizable group side of the main skeleton, the second electrophoretic particles 12 are negatively charged.

As the number of bonds of the substituent bonded to the main skeleton increases, the bias in the electron concentration exhibits a tendency to increase.

By selecting the polarization group in which the bias in the electron concentration arises, as appropriate, and introducing the polarization group to the surface of as a side chain of the monomer M4, it is possible to control (adjust) the second electrophoretic particles 12 to a desired charging state.

It is preferable to be in a state in which the bias in electron concentration easily arises in the main skeleton of the polarization group. Accordingly, it is preferable that the main skeleton have a part (structure) in which $\pi$ electrons are delocalized. In so doing, it is possible for movement of the electrons in the main skeleton to easily arise, and for bias in the electron concentration to be reliably caused to arise.

Although the part in which the $\pi$ electrons are delocalized may have a structure in which the all of the conjugated double bonds are connected in a straight chain, it is preferable to have a ring structure in which at least a part thereof form a ring. In so doing, the movement of the electrons more easily and smoothly occurs in the main skeleton.

Although various types of such a ring structure exist, it is preferable that the ring structure be an aromatic ring, and it is particularly preferable that the ring structure be a benzene ring, a naphthalene ring, a pyridine ring, a pyrrole ring, a thiophene ring, an anthracene ring, a pyrene ring, a perylene ring, a pentacene ring, a tetracene ring, a chrysene ring, an azulene ring, a fluorene ring, a triphenylene ring, a phenanthrene ring, a quinoline ring, an indole ring, a pyrazine ring, an acridine ring, a carbazole ring, a furan ring, a pyran ring, a pyrimidine ring, or a pyridazine ring. In so doing, bias (polarization) in the electron concentration easily arises in the ring structure, and, as a result, it is possible for the bias in the electron concentration in the main skeleton to be more remarkable.

It is preferable for the main skeleton to further include the ring structure at the terminal thereof, and for the substituent to be bonded to the ring structure. In so doing, bias (polarization) in the electron concentration easily arises in the ring structure, and, as a result, it is possible for the bias in the electron concentration in the main skeleton to be more remarkable.

In the electrophoretic particles of the invention, it is preferable that the substituent is an electron withdrawing group or an electron donating group.

In so doing, the second electrophoretic particles 12 are more reliably positively or negatively charged.

A case of the main skeleton having a benzene ring at the terminal thereof will be described as an example.

Figure 5A:
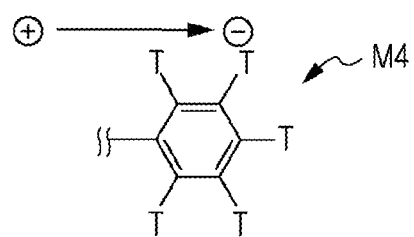
FIGS. 5A to 5F are views for describing a polarization group included in a polarization unit included in the block copolymer shown in FIG. 4.

In this case, when the electron withdrawing group as the substituent is bonded to at least three, that is, the third to fifth positions (all of the second to sixth positions in FIG. 5A) from the second to sixth positions of the I: benzene ring, as shown in FIG. 5A, the electrons in the main skeleton are drawn to the terminal side by the presence of the electron withdrawing group T, and biased. Therefore, the second electrophoretic particles 12 are negatively charged.

Figure 5B:
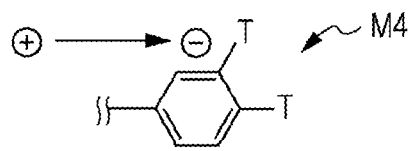

When the electron withdrawing group T as the substituent is bonded to at least one position (in FIG. 5B, third and fourth positions) of the third, fourth and fifth positions of the II: benzene ring, as shown in FIG. 5B, the electrons in the main skeleton (in particular, on the benzene ring) are drawn to the terminal side by the presence of the electron withdrawing group T, and biased. Therefore, the second electrophoretic particles 12 are negatively charged.

Figure 5C:
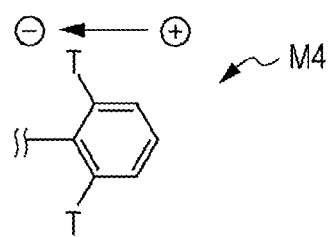

When the electron withdrawing group T as the substituent is bonded to at least one position (in FIG. 5C, second and sixth positions) of the second and sixth positions of the III: benzene ring, the electrons in the main skeleton (in particular, on the benzene ring) are drawn to the polymerizable group side by the presence of the electron withdrawing group T, and biased as shown in FIG. 5C. Therefore, the second electrophoretic particles 12 are positively charged.

Figure 5D:
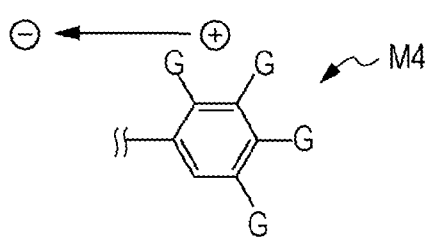

When the electron donating group G as the substituent is bonded to at least the three third to fifth positions (in FIG. 5D, four positions of second to fifth positions) from the second to sixth positions of the IV: benzene ring, as shown in FIG. 5D, the electrons in the main skeleton are drawn to the polymerizable group side by the presence of the electron donating group G, and biased. Therefore, the second electrophoretic particles 12 are positively charged.

Figure 5E:
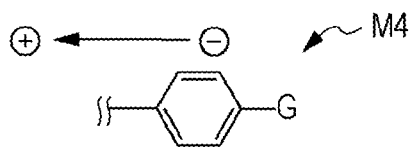

When the electron donating group G as the substituent is bonded to at least one position (in FIG. 5E, fourth position) from the third, fourth, and fifth positions of the V: benzene ring, as shown in FIG. 5E, the electrons in the main skeleton (in particular, on the benzene ring) are pushed to the polymerizable group side by the presence of the electron donating group G, and biased. Therefore, the second electrophoretic particles 12 are positively charged.

Figure 5F:
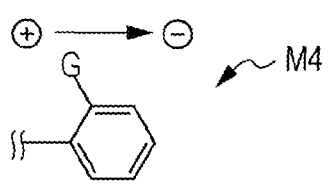

When the electron donating group G as the substituent is bonded to at least one position (in FIG. 5F, second position) from the second and sixth positions of the VI: benzene ring, as shown in FIG. 5F, the electrons in the main skeleton (in particular, on the benzene ring) are pushed to the terminal side by the presence of the electron donating group G, and biased. Therefore, the second electrophoretic particles 12 are negatively charged.

The II structure and VI structure, and the III structure and V structure may be respectively combined. In so doing, it is possible for the bias in the electron concentration in the main skeleton (in particular, on the benzene ring) to be still more remarkable.

The main skeleton may be configured by only one ring form described above, or may be a structure in which a plurality of ring structures is bonded in a straight chain.

Specific examples of the latter main skeleton include, for example, the following formulae (A-1) to (A-3).

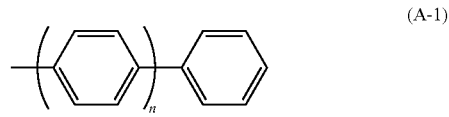

(A-1)

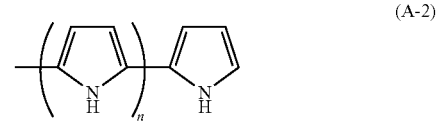

(A-2)

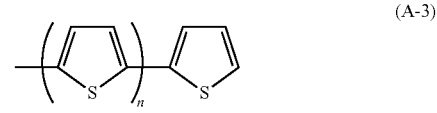

(A-3)

Here, in formulae (A-1) to (A-3), n in the formula indicates an integer of 1 or more.

Although it is preferable that the substituent is bonded to the ring structure of the terminal in the main skeleton represented in formulae (A-1) to (A-3), the substituent may be bonded to another ring structure other than the terminal.

The electron withdrawing group T is not particularly limited as long as it is a substituent that exhibits the tendency of being strongly drawn (withdrawn) compared to hydrogen atoms, and examples thereof include halogen atoms, such as F, Cl, Br and I, a cyano group, a nitro group, a carboxyl group, a trifluoromethyl group, a formyl group, and a sulfo group. Among these, it is preferable that the electron withdrawing group T be at least one type selected from a group formed from a halogen atom, a cyano group, a nitro group, a carboxyl group, and a trifluoromethyl group. These groups have a particularly high capacity for drawing electrons.

Meanwhile, the electron donating group G is not particularly limited as long as it is a substituent that exhibits a tendency toward strongly expelling (donating) electrons compared to hydrogen atoms, and examples thereof include an amino group, an alkyl group, an alkoxy group, and a hydroxyl group. Among these, the electron donating group is at least one type selected from a group formed from an amino group, an alkyl group, and an alkoxy group. These groups have a particularly high capacity for expelling electrons.

It is preferable that the alkyl group contains 1 to 30 carbon atoms, and more preferably 1 to 18 carbon atoms. It is preferable that the alkoxy group contains 1 to 30 carbon atoms, and more preferably 1 to 18 carbon atoms. When the number of carbon atoms is too high in the alkyl group and the alkoxy group, either one of the alkyl group and the alkoxy group exhibits a tendency to easily aggregate to themselves, and, as a result, there is concern of difficulty in adjusting the charging state of the second electrophoretic particles 12 to a desired state.

It is preferable that the total number of carbon atoms in the main skeleton is 6 to 40, and 6 to 35 is more preferable. When the total number of carbon atoms is too low, the atoms do not easily become delocalized, and there is concern that it may therefore be difficult for bias in the electrons to effectively arise, whereas, when the total number of carbon atoms is too high, there is concern of it being difficult to introduce polarization group to the side-chain of the monomer M4.

Specific examples of the monofunctional monomer component having such an organic group include components including an organic group instead of the acidic group in the monofunctional monomer having an acidic group described in the first electrophoretic particles 11.

In one polymer, it is preferable that the number of polarization units included in the polarization portion 43 is 1 or more to 8 or less, and 2 or more to 5 or less is more preferable. Because the polarization portion 43 has a low affinity to the dispersion medium compared to the dispersion portion 32 when the upper limit value is exceeded, there is concern of the dispersibility of the second electrophoretic particles 12 being lowered according to the type of monomer M4. When lower than the lower limit value, it is difficult for the second electrophoretic particles 12 to be sufficiently charged according to the type of monomer M4, and there is concern of the electrophoretic properties of the second electrophoretic particles 12 being lowered caused by this difficulty.

It is possible for the number of polarization units included in the polarization portion 43 to be obtained by analysis using a general-purpose analyzer, such as NMR spectrum, IR spectrum, element analysis, gel permeation chromatography (GPC) or the like. As described above, because the bonding portion 31, the dispersion portion 32, and the polarization portion 43 are macromolecular polymers in the polymer 49, both have a molecular weight distribution. Accordingly, although the results of the analysis as outlined above are not limited to corresponding to all of the polymer 49, it is possible for the reactivity between the polymer 49 and the coloring system particles 22 and the dispersibility and the electrophoretic properties (polarity) of the second electrophoretic particles 12 to both be achieved as long as the number of bonding units obtained with at least the above methods is 1 to 8.

The polymer 49 is a triblock copolymer which the bonding portion 31, the dispersion portion 32 and the polarization portion 43 are each separately provided. Therefore, because it is possible to independently impart each of bondability with respect to the coloring system particles 22, dispersibility of the second electrophoretic particles 12 and polarity (electrophoretic properties) of the second electrophoretic particles 12 to the polymer 49, the second electrophoretic particles 12 exhibit superior dispersibility and polarity.

The polymer 49 is obtained by the manufacturing method described later. When reversible addition-fragmentation chain-transfer polymerization (RAFT), described later, is used, it is possible to obtain a comparatively uniform polymer. Accordingly, if polymerization is performed by adding 2 to 8 mol equivalent of the monomer M2 with respect to the chain transfer agent, it is possible for the number of bonding units in the bonding portion 31 to be set to the above range, and if polymerization is performed by adding 1 to 8 mol equivalent of the monomer M4 with respect to the chain transfer agent, it is possible for the number of polarization units in the polarization portion 43 to be set to the above range.

In so doing, it is possible for the effects due to the second electrophoretic particles 12 having a configuration including the polymer 49 to be reliably exhibited, and the second electrophoretic particles 12 have superior dispersibility and electrophoretic properties (polarity) in the electrophoresis dispersion liquid.

As outlined above, it is possible to manufacture the second electrophoretic particles 12 of the embodiment in which the second block copolymer 49 having the bonding portion 31, the dispersion portion 32 and the polarization portion 43 are connected to the surface of the coloring system particles 22 at the bonding portion 31 in the following manner.

Method of Manufacturing Second Electrophoretic Particles

The method of manufacturing the second electrophoretic particles 12 includes a first step of obtaining the block copolymer 49 by the monomer M1, the monomer M2, and the monomer M4 being polymerized by living polymerization without the monomer M1 and the monomer M2 copolymerizing, and a second step of forming a coating layer 4 in which the plurality of block copolymers 49 are connected to the coloring system particles 22 by the first functional group included in the coloring system particles 22 and the second functional group included in the monomer M2 being reacted.

In the embodiment, a case of obtaining a plurality of block copolymers 49 in which the bonding portion 31, the polarization portion 43 and the dispersion portion 32 are connected in this order in the first step will be described.

In the first step, although 1A) the polarization portion 43 in which the fourth monomer M4 having the third functional group is polymerized may be formed after the dispersion portion 32 in which the first monomer M1 is polymerized is formed by living radical polymerization using a polymerization initiator, and thereafter the bonding portion 31 in which the second monomer M2 having the second functional group is polymerized may be formed, or 2A) the bonding portion 31, the polarization portion 43, and the dispersion portion 32 may be formed in this order, here, a case were the plurality of block copolymers 49 is formed with the method in 1A) will be described.

Below, each step will be described in detail.

[1A] First, the plurality of block copolymers 49 in which the dispersion portion 32, the polarization portion 43 and the bonding portion 31 are connected in this order is formed (first step).

[1A-1] First the dispersion portion 32 in which the first monomer M1 is formed similarly to the step [1-1] in the method of manufacturing the first electrophoretic particles described above.

[1A-2] Next, other than using the fourth monomer M4 instead of the third monomer M3, the polarization portion 43 in which the negatively charged fourth monomer M4 is polymerized so as to be connected to the dispersion portion 32 is formed, and the diblock copolymer in which the dispersion portion 32 and the polarization portion 43 are connected is generated, similarly to the above-described step [1-2] of method of manufacturing the first electrophoretic particles.

[1A-3] Next, the bonding portion 31 at which the second monomer M2 including the second functional group which has reactivity with the first functional group included in the coloring system particles 22 is polymerized is formed so as to be connected to the polarization portion 43 including the diblock copolymer in which the dispersion portion 32 and the polarization portion 43 are connected, similarly to the above-described step [1-3] of the method of manufacturing first electrophoretic particles.

In so doing, the second block copolymer 49 configured by a triblock copolymer in which the dispersion portion 32, the polarization portion 43 and the bonding portion 31 are connected in this order is generated.

[2A] Next, the plurality of second block copolymers 49 is connected to the coloring system particles 22 by the first functional group included in the coloring system particles 22 and the plurality of second functional groups included in the bonding portion 31 being reacted and a chemical bond being formed therebetween, similarly to the above-described step [2] of the method of manufacturing the first electrophoretic particles (second step).

In so doing, the second electrophoretic particles 12 in which at least a portion of the coloring system particles 22 is coated with the coating layer 4 are obtained.

In the embodiment, although a configuration in which the second electrophoretic particles are obtained by connecting the block copolymer including a polarization group to the coloring system particles is described, there is no limitation thereto, and the second electrophoretic particles may be configured with a coupling agent having a polarization group connected to the coloring system particles.

Second Embodiment

Next, the second embodiment of the first and second electrophoretic particles will be respectively described.

First Electrophoretic Particles

Figure 6:
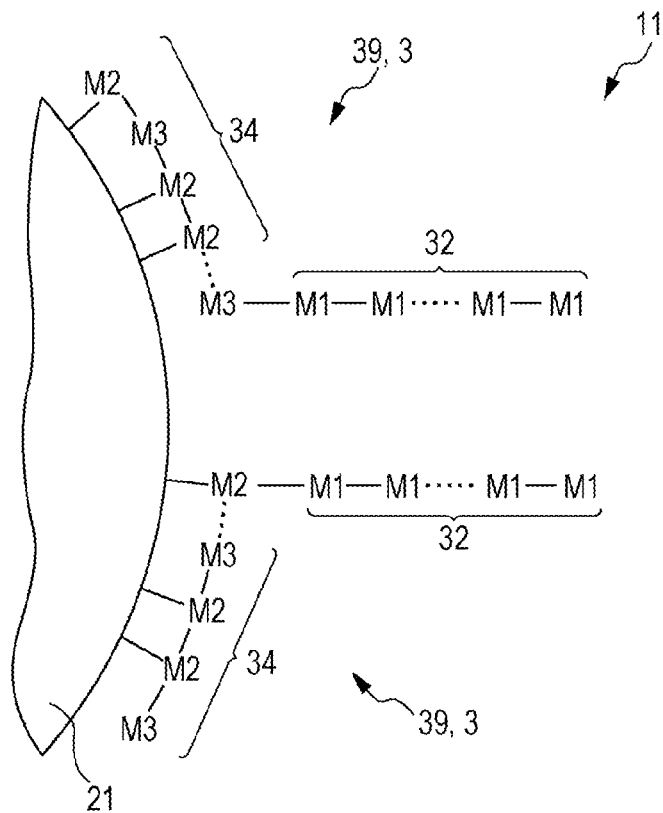
FIG. 6 is a schematic view of the block copolymer included in the second embodiment of the first electrophoretic particles.

FIG. 6 is a schematic view of the block copolymer included in the second embodiment of the first electrophoretic particles.

Below, the first electrophoretic particles of the second embodiment will be described centering on the points of difference to the first electrophoretic particles of the first embodiment, and similar matters will not be described.

The first electrophoretic particles 11 of the embodiment are the same as the first electrophoretic particles 11 of the first embodiment shown in FIG. 2 other than having a different configuration of the block copolymer 39 bonded to the scattering system particles 21 as shown in FIG. 6.

That is, in the first electrophoretic particles 11 of the second embodiment, the block copolymer 39 is a copolymer in which the dispersion portion 32 in which the first monomer M1 is polymerized and a bonding-ionic portion 34 in which the second monomer M2 and the third monomer M3 are copolymerized are connected. In the first block copolymer 39 with this configuration, the dispersion portion 32 is formed by polymerizing the monomer M1, and a plurality of dispersion units derived from the monomer M1 is included, the bonding-ionic portion 34 is formed by copolymerizing the monomer M2 and the monomer M3, and a plurality of the bonding units derived from the monomer M2 and the ionic units derived from the monomer M3 is included. In the bonding-ionic portion 34 included in the block copolymer 39, the scattering system particles 21 and the block copolymer 39 are chemically bonded by reacting the first functional group included in the scattering system particles 21 and the second functional group included in the bonding unit.

In the embodiment, the bonding-ionic portion 34 is a random copolymer formed by a plurality of the second monomer M2 including the second functional group and the negatively ionized third monomer M3 being copolymerized, and that can form a common bond by the scattering system particles 21 reacting with the first functional group included on the surface thereof, and has a plurality of bonding units derived from the monomer M2 and ionic units derived from the monomer M3 randomly connected.

The bonding-ionic portion 34 with this configuration exhibits a function of bonding to the surface of the scattering system particles 21 in the coating layer 3 included in the first electrophoretic particles 11 by including the bonding unit, and exhibits a function of imparting negative ionicity on the first electrophoretic particles 11 in the electrophoresis dispersion liquid by including the ionic unit.

That is, the bonding-ionic portion 34 has both functions included by the bonding portion 31 and the ionic portion 33 described in the first embodiment. Accordingly, the block copolymer 39 of the embodiment including the dispersion portion 32 and the bonding-ionic portion 34 exhibits the same function as the block copolymer 39 of the first embodiment including the dispersion portion 32, the ionic portion 33 and the bonding portion 31.

In one polymer 39, it is preferable that the number of bonding units included in the bonding-ionic portion 34 is 2 or more to 10 or less, and 3 or more to 6 or less is more preferable. It is preferable that the number of ionic units is 1 or more to 8 or less, and 2 or more to 5 or less is more preferable.

Although the electrophoretic particles having the block copolymer 39 of the embodiment including the dispersion portion 32 and the bonding-ionic portion 34 are obtained by making the first step of the method of manufacturing electrophoretic particles described in the first embodiment a step (first step) of generating a plurality of block copolymers 39 in which the dispersion portion 32 and the bonding-ionic portion 34 are connected, below the first step of the embodiment will be described.

In the first step, although 1B) the bonding-ionic portion 34 in which the second monomer M2 and the third monomer M3 are copolymerized may be formed after the dispersion portion 32 in which the first monomer M1 is polymerized is formed by living radical polymerization using a polymerization initiator, or 2B) the bonding-ionic portion 34 and the dispersion portion 32 may be formed in this order, here, a case were the plurality of block copolymers 39 is formed with the method in 1B) will be described.

Below, each step will be described in detail.

[1B-1] First, the dispersion portion 32 in which the first monomer M1 is polymerized is formed.

The same method as described by step [1-1] of the first embodiment is used as the method of forming the dispersion portion 32.

When using the reversible addition-fragmentation chain-transfer polymerization (RAFT) as the method by which the dispersion portion 32 is polymerized, fragments of the chain transfer agent used are present at one terminal (tip portion) of the dispersion portion 32. In the next step [1B-2], the dispersion portion 32 including the fragments acts as a chain transfer agent during the reaction in which the dispersion portion 32 is polymerized with the bonding-ionic portion 34.

[1B-2] Next, the bonding-ionic portion 34 at which the second monomer M2 including the second functional group which has reactivity with the first functional group included in the scattering system particles 21 and the negatively ionized third monomer M3 are copolymerized is formed so as to be connected to the dispersion portion 32.

In so doing, the polymer 39 configured by a diblock copolymer in which the dispersion portion 32 and the bonding-ionic portion 34 are connected is generated.

In step [1B-2], a purification treatment (removal treatment) that removes impurities such as unreacted monomer M1, solvent or polymerization initiator used in the step [1B-1], and isolates and purifies the dispersion portion 32 may be performed, as necessary, before forming the bonding-ionic portion 34 using the monomer M2 and the monomer M3. In so doing, it is possible for the polymer 39 obtained in the step [1B-2] to be more uniform and highly pure. The purification treatment is not particularly limited, and examples thereof include a column chromatography method, a recrystallization method, and a re-precipitation method, and it is possible to perform one type or a combination of two or more types thereof.

As described above, when using the reversible addition-fragmentation chain-transfer polymerization (RAFT), fragments of the chain transfer agent used are present at one terminal of the dispersion portion 32. Therefore, the bonding-ionic portion 34 with this configuration is formed by preparing the solution containing the dispersion portion 32 obtained with the step [1B-1] completed, the monomers M2 and M3, and the polymerization initiator, and again performing living polymerization initiator in the solution.

It is possible for the same solvents exemplified in the step [1-1] of the first embodiment to be used as the solvent used in this step, and it is possible for the conditions when the monomers M2 and M3 are polymerized in the solution to be the same as the those exemplified as the conditions when the monomer M1 is polymerized in the solution in the step [1-1] of the first embodiment.

By using the steps [1B-1] and [1B-2] as outlined above, it is possible for the block copolymer 39 of the embodiment including the dispersion portion 32 and the bonding-ionic portion 34 to be generated with the second step.

The same effects as the first embodiment are obtained even with the first electrophoretic particles 11 of the second embodiment that include the block copolymer 39 in which the dispersion portion 32 and the bonding-ionic portion 34 are connected.

Second Electrophoretic Particles

Next, the second embodiment of the second electrophoretic particles will be described.

Figure 7:
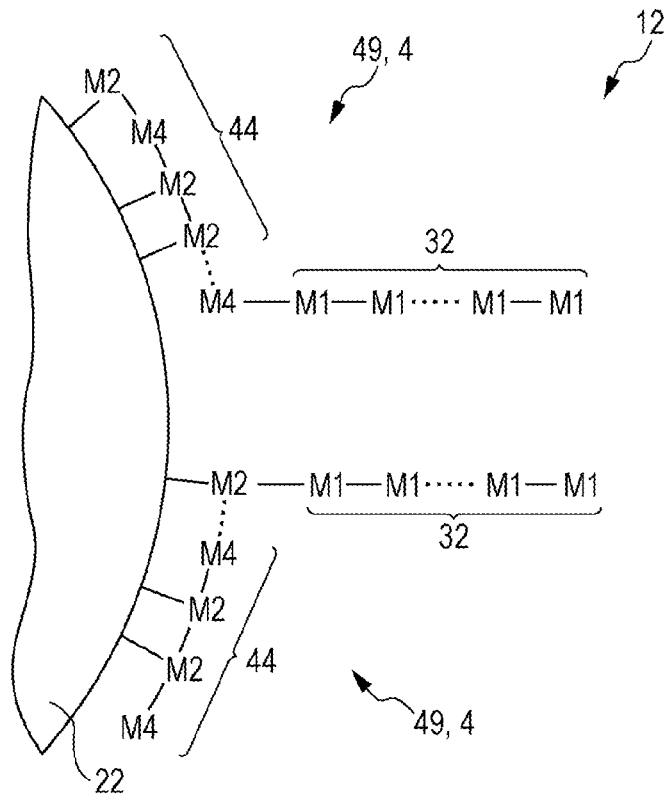
FIG. 7 is a schematic view of the block copolymer included in the second embodiment of the second electrophoretic particles.

FIG. 7 is a schematic view of the block copolymer included in the second embodiment of the second electrophoretic particles.

Below, the second electrophoretic particles of the second embodiment will be described centering on the points of difference to the second electrophoretic particles of the first embodiment, and similar matters will not be described.

The second electrophoretic particles 12 of the embodiment are the same as the second electrophoretic particles 12 of the first embodiment shown in FIG. 4 other than having a different configuration of the second block copolymer 49 bonded to the coloring system particles 22 as shown in FIG. 7.

That is, in the second electrophoretic particles 12 of the second embodiment, the second block copolymer 49 is a copolymer in which the dispersion portion 32 in which the first monomer M1 is polymerized, and a bonding-polarization portion 44 in which the second monomer M2 and the fourth monomer M4 are copolymerized are connected. In the block copolymer 49 with this configuration, the dispersion portion 32 is formed by polymerizing the monomer M1, and a plurality of dispersion units derived from the monomer M1 is included, the bonding-polarization portion 44 is formed by copolymerizing the monomer M2 and the monomer M4, and a plurality of the bonding units derived from the monomer M2 and the polarization units derived from the monomer M4 is included. In the bonding-polarization portion 44 included in the block copolymer 49, the coloring system particles 22 and the second block copolymer 49 are chemically bonded by reacting the first functional group included in the coloring system particles 22 and the second functional group included in the bonding unit.

The bonding-polarization portion 44 is a random copolymer formed by a plurality of the second monomer M2 including the second functional group and the negatively ionized fourth monomer M4 being copolymerized, and that can form a common bond by the coloring system particles 22 reacting with the first functional group included on the surface thereof, and has a plurality of bonding units derived from the monomer M2 and polarization units derived from the monomer M4 randomly connected.

The bonding-polarization portion 44 with this configuration exhibits a function of bonding to the surface of the coloring system particles 22 in the coating layer 3 included in the second electrophoretic particles 12 by including the bonding unit, and exhibits a function of imparting negative or positive polarity on the second electrophoretic particles 12 in the electrophoresis dispersion liquid by including the polarization unit.

That is, the bonding-polarization portion 44 has both functions included by the bonding portion 31 and the polarization portion 43 described in the first embodiment. Accordingly, the second block copolymer 49 of the embodiment including the dispersion portion 32 and the bonding-polarization portion 44 exhibits the same function as the second block copolymer 49 of the first embodiment including the dispersion portion 32, the polarization portion 43 and the bonding portion 31.

In one polymer 49, it is preferable that the number of bonding units included in the bonding-polarization portion 44 is 2 or more to 10 or less, and 3 or more to 6 or less is more preferable. It is preferable that the number of polarization units is 1 or more to 8 or less, and 2 or more to 5 or less is more preferable.

Although the second electrophoretic particles 12 having the second block copolymer 49 of the embodiment including the dispersion portion 32 and the bonding-polarization portion 44 are obtained by making the first step of the method of manufacturing the second electrophoretic particles 12 described in the first embodiment a step (first step) of generating a plurality of block copolymers 49 in which the dispersion portion 32 and the bonding-polarization portion 44 are connected, below the first step of the embodiment will be described.

In the first step, although 1C) the bonding-polarization portion 44 in which the second monomer M2 and the fourth monomer M4 are copolymerized may be formed after the dispersion portion 32 in which the first monomer M1 is polymerized is formed by living radical polymerization using a polymerization initiator, or 2C) the bonding-polarization portion 44 and the dispersion portion 32 may be formed in this order, here, a case were the plurality of block copolymers 49 is formed with the method in 1C) will be described.

Below, each step will be described in detail.

[1C-1] First, the dispersion portion 32 in which the first monomer M1 is polymerized is formed.

The same method as described by step [1B-1] of the first embodiment is used as the method of forming the dispersion portion 32.

When using the reversible addition-fragmentation chain-transfer polymerization (RAFT) as the method by which the dispersion portion 32 is polymerized, fragments of the chain transfer agent used are present at one terminal (tip portion) of the dispersion portion 32. In the next step [1C-2], the dispersion portion 32 including the fragments acts as a chain transfer agent during the reaction in which the bonding-polarization portion 44 is reacted with the dispersion portion 32.

[1C-2] Next, the bonding-polarization portion 44 at which the second monomer M2 including the second functional group which has reactivity with the first functional group included in the coloring system particles 22 and the negatively or positively polarized fourth monomer M4 are copolymerized is formed so as to be connected to the dispersion portion 32.

In so doing, the polymer 49 configured by the diblock copolymer in which the dispersion portion 32 and the bonding-polarization portion 44 are connected is generated.

In step [1C-2], a purification treatment (removal treatment) that removes impurities such as unreacted monomer M1, solvent or polymerization initiator used in the step [1C-1], and isolates and purifies the dispersion portion 32 may be performed, as necessary, before forming the bonding-polarization portion 44 using the monomer M2 and the monomer M4. In so doing, it is possible for the polymer 49 obtained in the step [1C-2] to be more uniform and highly pure. The purification treatment is not particularly limited, and examples thereof include a column chromatography method, a recrystallization method, and a re-precipitation method, and it is possible to perform one type or a combination of two or more types thereof.

As described above, when using the reversible addition-fragmentation chain-transfer polymerization (RAFT), fragments of the chain transfer agent used are present at one terminal of the dispersion portion 32. Therefore, the bonding-polarization portion 44 with this configuration is formed by preparing the solution containing the dispersion portion 32 obtained with the step [1C-1] completed, the monomers M2 and M4, and the polymerization initiator, and again performing living polymerization initiator in the solution.

It is possible for the same solvents exemplified in the step [1-1] of the first embodiment to be used as the solvent used in this step, and it is possible for the conditions when the monomer M2 and the monomer M4 are copolymerized in the solution to be the same as the those exemplified as the conditions when the monomer M1 is polymerized in the solution in the step [1-1] of the first embodiment.

By using the steps [1C-1] and [1C-2] as outlined above, it is possible for the second block copolymer 49 of the embodiment including the dispersion portion 32 and the bonding-polarization portion 44 to be generated with the second step.

The same effects as the first embodiment are obtained even with the second electrophoretic particles 12 of the second embodiment that include the block copolymer 49 in which the dispersion portion 32 and the bonding-polarization portion 44 are connected.

Third Embodiment

Next, the third embodiment of the first and second electrophoretic particles will be respectively described.
First Electrophoretic Particles FIG. 8 is a schematic view of the block copolymer included in the third embodiment of the first electrophoretic particles.

Below, the first electrophoretic particles of the third embodiment will be described centering on the points of difference to the first electrophoretic particles of the first embodiment, and similar matters will not be described.

Figure 8:
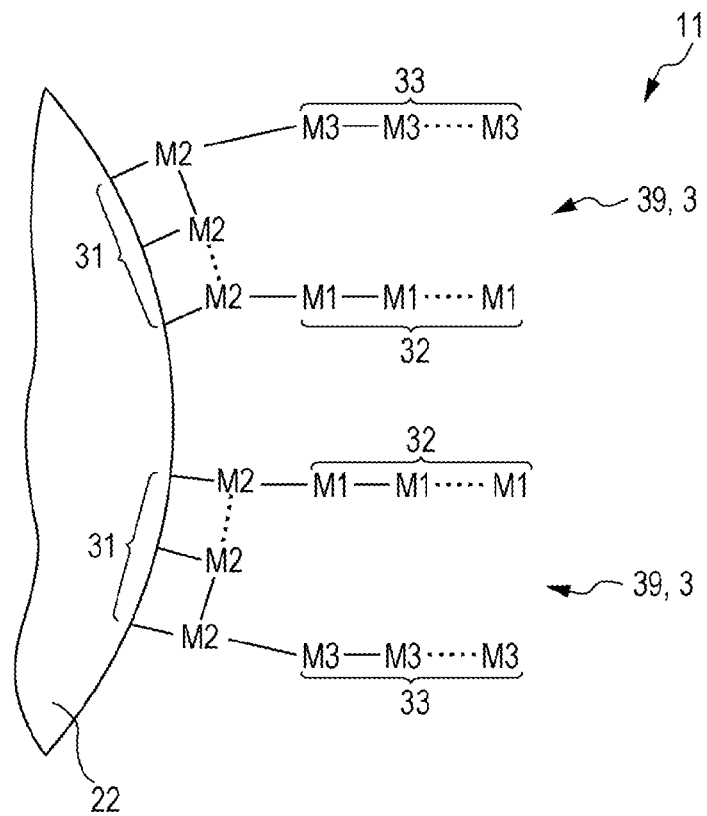
FIG. 8 is a schematic view of the block copolymer included in the third embodiment of the first electrophoretic particles.

The first electrophoretic particles 11 of the embodiment are the same as the first electrophoretic particles 11 of the first embodiment shown in FIG. 2 other than having a different configuration of the first block copolymer 39 bonded to the scattering system particles 21 as shown in FIG. 8.

That is, in the electrophoretic particles of the third embodiment, the first block copolymer 39 is a copolymer in which the dispersion portion 32 in which the first monomer M1 is polymerized, a bonding portion 31 in which the second monomer M2 is polymerized and ionic portion 33 in which the third monomer M3 is polymerized are connected in this order.

That is, in the embodiment, the order in which the bonding portion 31, the dispersion portion 32, and the ionic portion 33 are connected in the first block copolymer 39 is different to the first embodiment, the configuration includes the dispersion portion 32 and the ionic portion 33 at both ends with the bonding portion 31 as a center.

In the first block copolymer 39 with this configuration, the dispersion portion 32 is formed by polymerizing the monomer M1, and a plurality of dispersion units derived from the monomer M1 is included, the bonding portion 31 is formed by polymerizing the monomer M2, and a plurality of the bonding units derived from the monomer M2 is included, the ionic portion 33 is formed by polymerizing the monomer M3, and a plurality of the ionic units derived from the monomer M3 is included.

In the bonding portion 31 included in the block copolymer 39, the scattering system particles 21 and the first block copolymer 39 are chemically bonded by reacting the first functional group included in the scattering system particles 21 and the second functional group included in the bonding unit. The dispersion portion 32 exhibits a function of imparting dispersibility to the first electrophoretic particles 11 in the electrophoresis dispersion liquid by including the dispersion units. The ionic portion 33 exhibits a function of imparting negative ionicity to the first electrophoretic particles 11 in the electrophoresis dispersion liquid by including the ionic units.

Accordingly, the first block copolymer 39 of the embodiment in which the dispersion portion 32, the ionic portion 33 and the bonding portion 31 are connected in this order exhibits the same function as the first block copolymer 39 of the first embodiment in which the dispersion portion 32, the ionic portion 33 and the bonding portion 31 are connected in this order.

Although the first electrophoretic particles 11 having the first block copolymer 39 of the embodiment including the dispersion portion 32, the bonding portion 31, and the ionic portion 33 are obtained by making the first step of the method of manufacturing the first electrophoretic particles described in the first embodiment a step (first step) of generating a plurality of block copolymers 39 in which the dispersion portion 32, the ionic portion 33 and the bonding portion 31 are connected in this order, below the first step of the embodiment will be described.

In the first step, although 1D) the bonding portion 31 in which the second monomer M2 is polymerized may be formed after the dispersion portion 32 in which the first monomer M1 is polymerized is formed by living radical polymerization using a polymerization initiator, and thereafter the ionic portion 33 in which the third monomer M3 is polymerized may be formed, or 2D) the ionic portion 33, the bonding portion 31 and the dispersion portion 32 may be formed in this order, here, a case were the plurality of block copolymers 39 is formed with the method in 1D) will be described.

In this case, it is possible for the first block copolymer 39 in the embodiment to be formed by carrying out the steps [1-1] to [1-3] in the first step of the method of manufacturing the first electrophoretic particles described by the first embodiment in the order of step [1-1], step [1-3], and the step [1-2], that is, with the order of the steps [1-2] and [1-3] reversed.

The same effects as the first embodiment are obtained even with the electrophoretic particles of the third embodiment that include the first block copolymer 39 dispersion portion 32, the ionic portion 33 and the bonding portion 31 are connected in this order.

Second Electrophoretic Particles

Next, the third embodiment of the second electrophoretic particles will be described.

Figure 9:
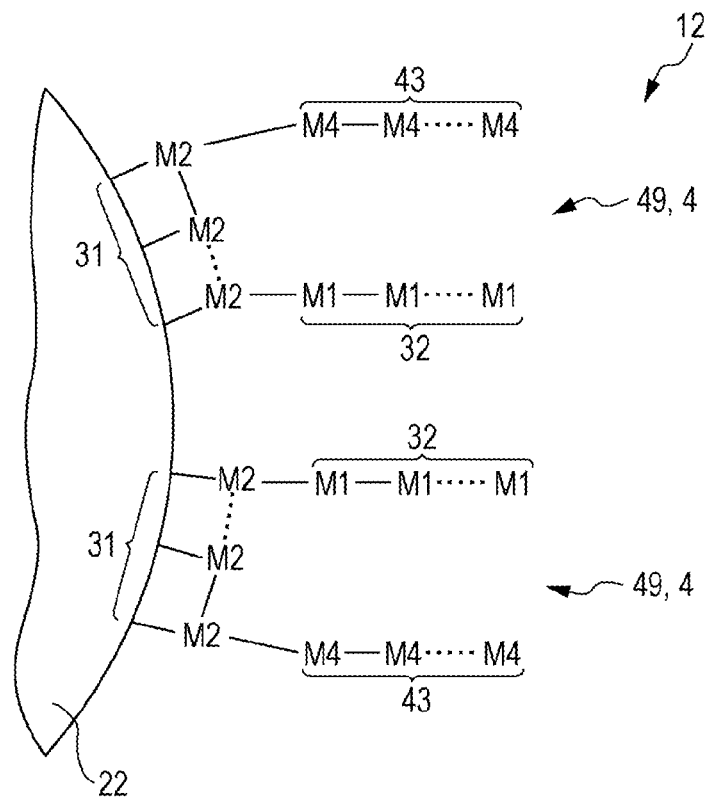
FIG. 9 is a schematic view of the block copolymer included in the third embodiment of the second electrophoretic particles.

FIG. 9 is a schematic view of the block copolymer included in the third embodiment of the second electrophoretic particles.

Below, the second electrophoretic particles of the third embodiment will be described centering on the points of difference to the second electrophoretic particles of the first embodiment, and similar matters will not be described.

The second electrophoretic particles 12 of the embodiment are the same as the second electrophoretic particles 12 of the first embodiment shown in FIG. 4 other than having a different configuration of the second block copolymer 49 bonded to the coloring system particles 22 as shown in FIG. 9.

That is, in the electrophoretic particles of the third embodiment, the second block copolymer 49 is a copolymer in which the dispersion portion 32 in which the first monomer M1 is polymerized, the bonding portion 31 in which the second monomer M2 is polymerized, and the polarization portion 43 in which the third monomer M3 is polymerized are connected in this order.

That is, in the embodiment, the order in which the bonding portion 31, the dispersion portion 32, and the polarization portion 43 are connected in the second block copolymer 49 is different to the first embodiment, the configuration includes the dispersion portion 32 and the polarization portion 43 at both ends with the bonding portion 31 as a center.

In the second block copolymer 49 with this configuration, the dispersion portion 32 is formed by polymerizing the monomer M1, and a plurality of dispersion units derived from the monomer M1 is included, the bonding portion 31 is formed by polymerizing the monomer M2, and a plurality of the bonding units derived from the monomer M2 is included, the polarization portion 43 is formed by polymerizing the monomer M3, and a plurality of the polarization units derived from the monomer M3 is included.

In the bonding portion 31 included in the second block copolymer 49, the coloring system particles 22 and the second block copolymer 49 are chemically bonded by reacting the first functional group included in the coloring system particles 22 and the second functional group included in the bonding unit. The dispersion portion 32 exhibits a function of imparting dispersibility to the second electrophoretic particles 12 in the electrophoresis dispersion liquid by including the dispersion units. The polarization portion 43 exhibits a function of imparting positive or negative polarity to the second electrophoretic particles 12 in the electrophoresis dispersion liquid by including the polarization units.

Accordingly, the second block copolymer 49 of the embodiment including the dispersion portion 32, the bonding portion 31, and the polarization portion 43 exhibits the same function as the second block copolymer 49 of the first embodiment in which the dispersion portion 32, the polarization portion 43 and the bonding portion 31 are connected in this order.

Although the second electrophoretic particles 12 having the second block copolymer 49 of the embodiment including the dispersion portion 32, the bonding portion 31, and the polarization portion 43 are obtained by making the first step of the method of manufacturing the second electrophoretic particles described in the first embodiment a step (first step) of generating a plurality of second block copolymers 49 in which the dispersion portion 32, the bonding portion 31 and the polarization portion 43 are connected in this order, below the first step of the embodiment will be described.

In the first step, although 1E) the dispersion portion 32 in which the first monomer M1 is polymerized may be formed by living radical polymerization using a polymerization initiator before forming the bonding portion 31 in which the second monomer M2 is polymerized, and thereafter the polarization portion 43 in which the third monomer M3 is polymerized may be formed, or 2E) the polarization portion 43, the bonding portion 31 and the dispersion portion 32 may be formed in this order, here, a case were the plurality of second block copolymers 49 is formed with the method in 1E) will be described.

In this case, it is possible for the second block copolymer 49 in the embodiment to be formed by carrying out the steps [1A-1] to [1A-3] in the first step of the method of manufacturing the second electrophoretic particles described by the first embodiment in the order of step [1A-1], step [1A-3], and the step [1A-2], that is, with the order of the steps [1A-2] and [1A-3] reversed.

The same effects as the first embodiment are obtained even with the electrophoretic particles of the third embodiment that include the second block copolymer 49 in which the dispersion portion 32, the polarization portion 43, and the bonding portion 31 are connected in this order.

Electrophoresis Dispersion Liquid

Next, the electrophoresis dispersion liquid of the invention will be described.

The electrophoresis dispersion liquid is a liquid in which the above-described first electrophoretic particles 11 and the second electrophoretic particles 12 are dispersed (suspended) in a dispersion medium (liquid phase dispersion medium).

It is preferable that a dispersion medium having a boiling point of 100° C. or more and comparatively high insulation properties is used. Examples of the dispersion medium include various types of water (for example, distilled water, pure water, and the like), alcohols such as butanol and glycerin, cellosolves such as butyl cellosolve, esters such as butyl acetate, ketones such as dibutyl ketones, aliphatic hydrocarbons such as pentane (liquid paraffin), alicyclic hydrocarbons such as cyclohexane, aromatic hydrocarbons such as xylene, halogenated hydrocarbons such as methylene chloride, aromatic heterocycles such as pyridine, nitriles such as acetonitrile, amides such as N, N-dimethyl formamide, carboxylic acid salt, and silicone oil, or various other types of oil, and these may be used independently or as a mixture.

Among these, it is preferable for a medium having aliphatic hydrocarbons (liquid paraffin) or silicone oil as a main component to be used as the dispersion medium. Since the dispersion medium having liquid paraffin or silicone oil as a main component has a high aggregation suppression effect on the first electrophoretic particles 11 and the second electrophoretic particles 12, it is possible suppress deterioration over time of the display performance of the electrophoresis display device 920 shown in FIG. 10. Liquid paraffin or silicone oil has excellent weather resistance because of not having unsaturated bonds, and has the further advantage of high safety.

It is preferable for a dispersion medium with a relative dielectric constant of 1.5 or more to 3 or less to be used, and 1.7 or more to 2.8 or less is more preferable. The dispersion medium has superior dispersibility of the first electrophoretic particles 11 and the second electrophoretic particles 12, and also has excellent electrical insulation properties. Therefore, this contributes to realizing an electrophoresis display device 920 with a reduced power consumption and capable of high contrast display. The value of the dielectric constant is a value measured at 50 Hz, and is a value measured for the dispersion medium with a contained moisture amount of 50 ppm or less and a temperature of 25° C.

Various additives such as charge control agents composes of particles, such as an electrolyte, a surfactant (anionic or cationic), a metallic soap, a resin material, a rubber material, a petroleum, a varnish, or a compound, a lubricant, a stabilizer, and various dyes may be added to the dispersion medium as necessary.

Dispersion of the electrophoretic particles in the dispersion medium is possible by performing one or a combination of two or more types from a paint shaker method, a ball mill method, a media mill method, an ultrasound dispersion method or a stirring dispersion method, or the like.

In the electrophoresis dispersion liquid, the first electrophoretic particles 11 and the second electrophoretic particles 12 exhibit a superior dispersion capacity due to the action of the polymer 39 and the polymer 49 included in the coating layer 3 and the coating layer 4, respectively, and further exhibit and further exhibit superior ionicity and polarity due to the action of the polymer 39 and the polymer 49 included in the coating layer 3 and the coating layer 4, respectively.

Third electrophoretic particles of a scattering system having an ionic group on the surface thereof or a coloring system having a polarization group on the surface thereof may be included, in addition to the particles 11 and 12, in the electrophoresis dispersion liquid (electrophoresis dispersion liquid in the invention) including the first electrophoretic particles 11 and the second electrophoretic particles 12.

Electrophoresis Display Device

Next, the electrophoresis display device to which the electrophoresis sheet of the invention is applied (electrophoresis device of the invention) will be described.

Figure 10:
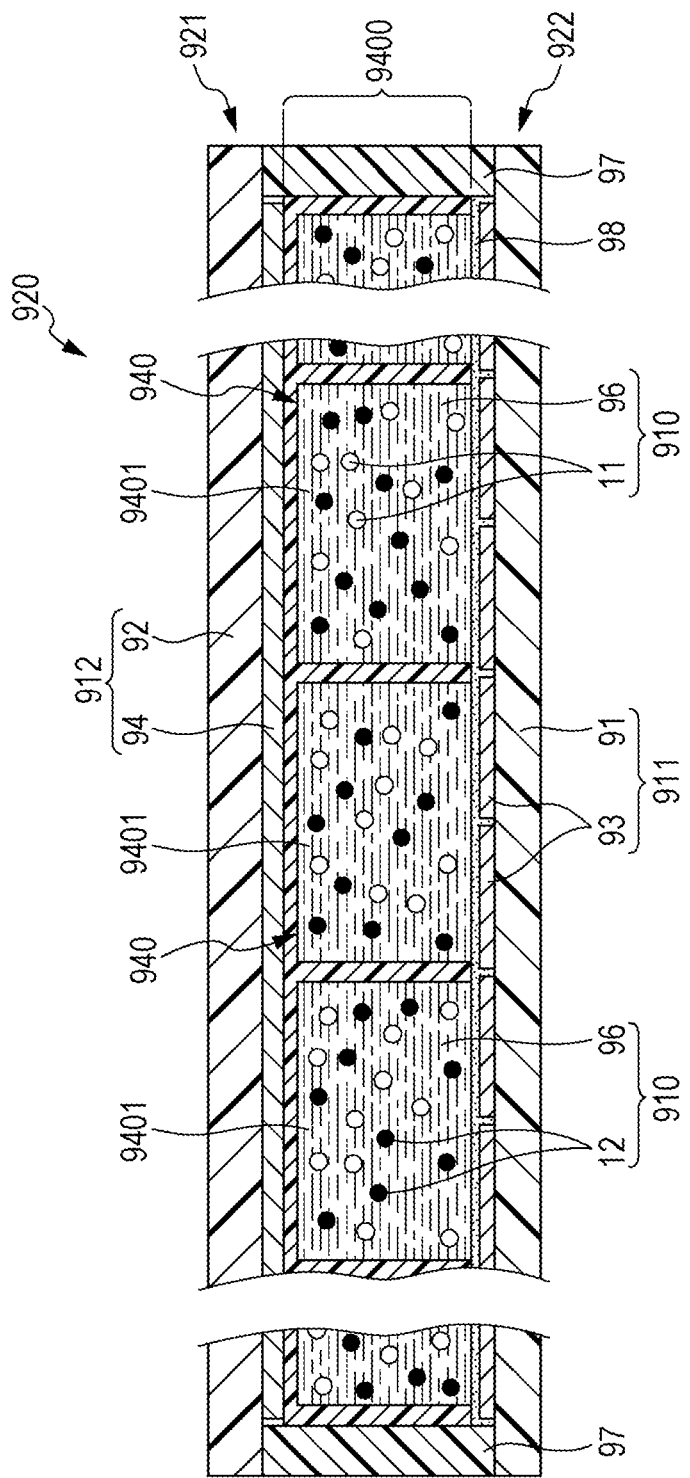
FIG. 10 is a view schematically showing a longitudinal cross-section of an embodiment of an electrophoresis display device.

FIG. 10 is a view schematically showing a longitudinal cross-section of an embodiment of an electrophoresis display device and FIGS. 11A and 11B are schematic views showing an operation principle of the electrophoresis display device shown in FIG. 10. Below, for ease of description, description will be provided with the upper side in FIGS. 10, 11A, and 11B as "up" and the lower side as "down".

The electrophoresis display device 920 shown in FIG. 10 includes an electrophoresis display sheet (front plane) 921, a circuit substrate (back plane) 922, an adhesive layer 98 that bonds the electrophoresis display sheet 921 and the circuit substrate 922, and a sealing portion 97 that hermetically seals the gap between the electrophoresis display sheet 921 and the circuit substrate 922.

The electrophoresis display sheet (electrophoresis sheet of the invention) 921 includes a substrate 912 provided with a plate-like base portion 92 and a second electrode 94 provided on the lower surface of the base portion 92 and a display layer 9400 which is provided on the lower surface (one surface) of the substrate 912 and configured by a dividing wall 940 formed in a matrix, and the electrophoresis dispersion liquid 910.

Meanwhile, the circuit substrate 922 includes a counter substrate 911 provided with a plate-like base portion 91 and a plurality of first electrodes 93 provided on the upper surface of the base portion 91, a circuit (not shown) which is provided on the counter substrate 911 (base portion 91) and includes a switching element such as a TFT, and a driving IC (not shown) by which the switching element is driven.

Below, the configuration of each portion will be sequentially described.

The base portions 91 and 92 are respectively configured by sheet-like (flat plate-like) members, and each member arranged therebetween has a supporting and protecting function.

Although each base portion 91 and 92 may be either flexible or hard, flexible is preferable. By using flexible base portions 91 and 92, it is possible to obtain a flexible electrophoresis display device 920, that is, an electrophoresis display device 920 useful in the construction of electronic paper.

In a case where each base portion (base material layer) 91 and 92 have flexibility, it is preferable that these are each configured by a resin material.

The average thickness of the base portions 91 and 92 are each set, as appropriate, according to the constituent materials, usage or the like, and although not particularly limited, approximately 20 μm to 500 μm is preferable, and approximately 25 μm to 250 μm is more preferable.

A layered (film-like) first electrode 93 and second electrode 94 are respectively provided on the surface of the dividing wall 940 side of the base portions 91 and 92, that is, on the upper surface of the base portion 91 and the lower surface of the base portion 92.

When a voltage is applied between the first electrode 93 and the second electrode 94, an electric field arises therebetween, and the electric field acts on the first electrophoretic particles 11 and the second electrophoretic particles 12.

In the embodiment, the second electrode 94 is the common electrode, and the first electrode 93 is an individual electrode (pixel electrode connected to the switching element) divided in a matrix-shape (grid shape), and the parts where the second electrode 94 and one first electrode 93 configure one pixel electrode.

The constituent material of each electrode 93 and 94 is not particularly limited as long as each substantially has conductivity.

The average thickness of the electrodes 93 and 94 are each set, as appropriate, according to the constituent materials, usage or the like, and although not particularly limited, approximately 0.05 μm to 10 μm is preferable, and approximately 0.05 μm to 5 μm is more preferable.

From each of the base portions 91 and 92 and each of the electrodes 93 and 94, the base portion and electrode (in the embodiment, the base portion 92 and the second electrode 94) arranged at the display surface side each have optical transparency, that is, are made substantially transparent (colorless and transparent, colored and transparent, or translucent).

In the electrophoresis display sheet 921, the display layer 9400 is provided contacting the lower surface of the second electrode 94.

The display layer 9400 is configured so that the electrophoresis dispersion liquid (the above-described electrophoresis dispersion liquid of the invention) 910 is accommodated (sealed) in the plurality of pixel spaces 9401 defined by the dividing wall 940.

The dividing wall 940 is formed between the counter substrate 911 and the substrate 912 so as to be divided in a matrix.

Examples of the constituent material of the dividing wall 940 include various types of resin materials such as thermoplastic resins, such as acrylic resins, urethane resins, and olefin resins, and heat-curable resins, such as epoxy resins, melamine resins, and phenolic resins, and it is possible to use one type or a combination of two or more kinds thereof.

The electrophoresis dispersion liquid 910 accommodated in the pixel space 9401 is a liquid in which the first electrophoretic particles 11 and the second electrophoretic particles 12 are dispersed (suspended) in a dispersion medium 96, and the above-described electrophoresis dispersion liquid of the invention is applied. In the embodiment, white particles are applied as the first electrophoretic particles 11, and black particles are applied as the second electrophoretic particles 12.

In the electrophoresis display device 920, when a voltage is applied between the first electrode 93 and the second electrode 94, the first electrophoretic particles 11 and the second electrophoretic particles 12 undergo electrophoresis toward either electrode according to the electric field arising therebetween.

In the embodiment, particles having negative ionicity (negative charge) are used as the first electrophoretic particles (white particles) 11, and particles having positive polarity (positive charge) are used as the second electrophoretic particles (black particles) 12.

In a case of using the first electrophoretic particles 11, when the first electrode 93 has a positive potential, the first electrophoretic particles (white particles) 11 move to the first electrode 93 side and gather at the first electrode 93 as shown in FIG. 11A. Meanwhile, the second electrophoretic particles (black particles) 12 move to the second electrode 94 side and gather at the second electrode 94. Therefore, when the electrophoresis display device 920 is seen from above (display surface side), the color of the second electrophoretic particles (black particles) 12 is visible, that is, black is visible. In this case, in the embodiment, the second electrophoretic particles (black particles) 12 are imparted with chargeability through the polarity by the second electrophoretic particles 12 having a polarization portion 43. Through this polarity, it is possible to increase the storage properties of the second electrophoretic particles (black particles) 12 gathered at the second electrode 94. As a result, the color black with which the coloring system particles 22 are colored can be more remarkably observed.

Conversely, when the first electrode 93 has a negative potential, the first electrophoretic particles (white particles) 11 move to the second electrode 94 side and gather at the second electrode 94, as shown in FIG. 11B. Meanwhile, the second electrophoretic particles (black particles) 12 move to the first electrode 93 side and gather at the first electrode 93. Therefore, when the electrophoresis display device 920 is seen from above (display surface side), the color of the first electrophoretic particles (white particles) 11 is visible, that is, white is visible. In this case, in the embodiment, the first electrophoretic particles (white particles) 11 are imparted with chargeability through the ionicity by the first electrophoretic particles 11 having an ionic portion 33. Through this ionicity, the storage properties of the first electrophoretic particles (white particles) 11 gathered at the second electrode 94 are lowered. Therefore, the separation distance between the first electrophoretic particles 11 gathered at the second electrode 94 is increased. As a result, because it is possible for light to be more remarkably scattered by the scattering system particles 21, it is possible for the color white due to the scattering to be more reliably recognized.

As outlined above, because it is possible to display black and white, the electrophoresis display device 920 exhibits superior display characteristics.

In such a configuration, by setting, as appropriate, the charging amount of the first electrophoretic particles (white particles) 11 and the second electrophoretic particles (black particles) 12, the polarity of the electrode 93 or 94, the potential difference between the electrodes 93 and 94, and the like, desired information (image) is displayed on the display surface side of the electrophoresis display device 920 according to the combination of first electrophoretic particles (white particles) 11 and second electrophoretic particles (black particles) 12 or the number of particles that gather at the electrodes 93 and 94.

It is preferable for the specific gravity of the first electrophoretic particles 11 and the second electrophoretic particles 12 to be set so as to be substantially the same as the specific gravity of the dispersion medium 96. In so doing, it is possible for the first electrophoretic particles 11 and the second electrophoretic particles 12 to retain a fixed position in the dispersion medium 96 for a long period of time even after the application of the voltage between the electrodes 93 and 94 is stopped. That is, the information displayed on the electrophoresis display device 920 is held for a long period of time.

It is preferable that the average particle diameter of the first electrophoretic particles 11 and the second electrophoretic particles 12 is approximately 0.1 µm to 10 µm, and approximately 0.1 µm to 7.5 µm is more preferable. By having the average particle diameter of the first electrophoretic particles 11 and the second electrophoretic particles 12 in the above range, it is possible to reliably prevent aggregation between the first electrophoretic particles 11 and the second electrophoretic particles 12 or precipitation in the dispersion medium 96, and as a result, it is possible to favorably prevent deterioration of the display quality of the electrophoresis display device 920.

In the embodiment, the electrophoresis display sheet 921 and the circuit substrate 922 are bonded via the adhesive layer 98. In so doing, it is possible for the electrophoresis display sheet 921 and the circuit substrate 922 to be more reliably fixed.

Although the average thickness of the adhesive layer 98 is not particularly limited, approximately 1 µm to 30 µm is preferable, and approximately 5 µm to 20 µm is more preferable.

The sealing portion 97 is provided between the base portions 91 and 92 along the edge portions thereof. Each electrode 93 and 94, the display layer 9400, and the adhesive layer 98 are hermetically sealed by the sealing portion 97. In so doing, it is possible for moisture to be prevented from infiltrating into the electrophoresis display device 920 and to more reliably prevent the deterioration of the display performance of the electrophoresis display device 920.

It is possible for the same materials as the examples of the constituent materials of the above-described dividing wall 940 to be used as the constituent material of the sealing portion 97.

Electronic Apparatus

Next, the electronic apparatus of the invention will be described.

The electronic apparatus of the invention is provided with the electrophoresis display device 920 as described above.

Electronic Paper

First, an embodiment of a case where the electronic apparatus of the invention is applied to electronic paper will be described.

Figure 12:
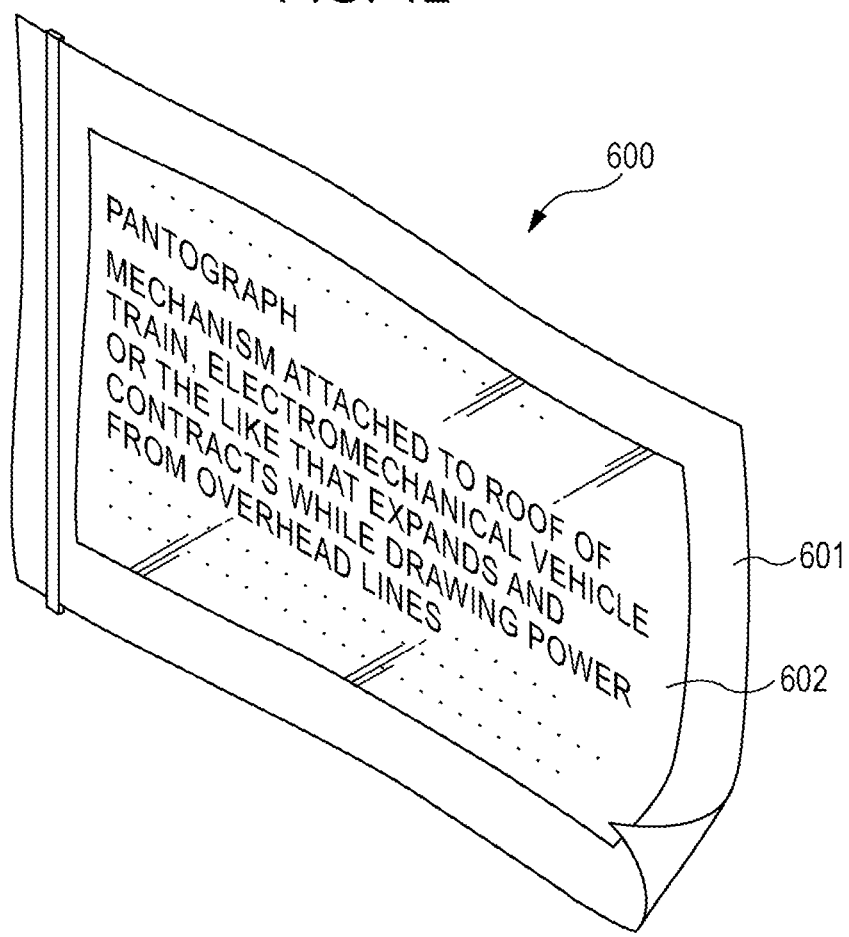
FIG. 12 is a perspective view showing an embodiment of a case where an electronic apparatus of the invention is applied to an electronic paper.

FIG. 12 is a perspective view showing an embodiment of a case where the electronic apparatus of the invention is applied to an electronic paper.

The electronic paper 600 shown in FIG. 12 is provided with a main body 601 configured by a rewritable sheet having the same texture and flexibility as paper, and a display unit 602.

In the electronic paper 600, the display unit 602 is configured by the electrophoresis display device 920 as described above.

Display

Next, an embodiment of a case where the electronic apparatus of the invention is applied to a display will be described.

Figure 13A:
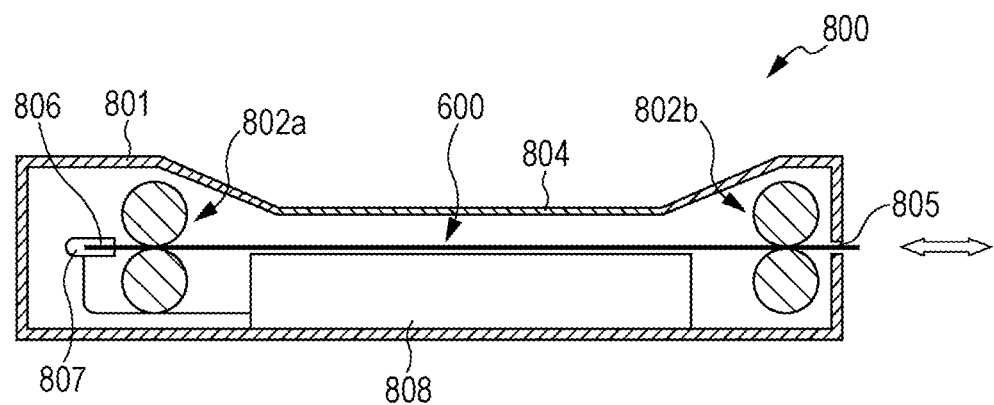
FIGS. 13A and 13B are views showing an embodiment of a case where the electronic apparatus of the invention is applied to a display.
Figure 13B:
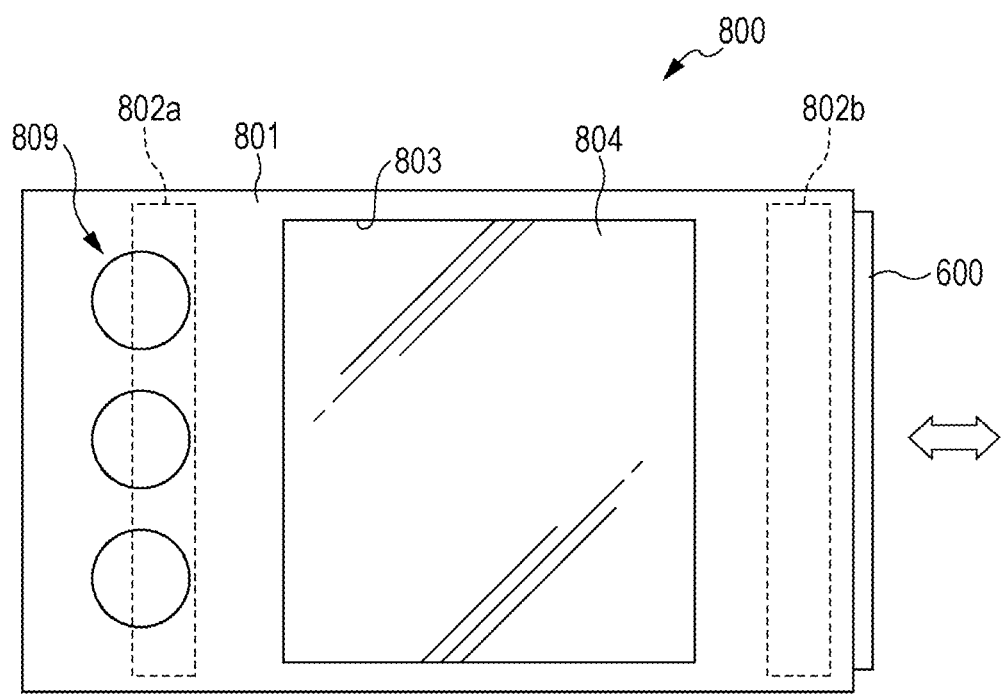

FIGS. 13A and 13B are diagrams showing an embodiment of a case where the electronic apparatus of the invention is applied to a display. Among these, FIG. 13A is a cross-sectional view, and FIG. 13B is a plan view.

The display (display device) 800 shown in FIGS. 13A and 13B is provided with a main body unit 801, and an electronic paper 600 provided so as to be freely detachable with respect to the main body unit 801.

The main body unit 801 has an insertion port 805 allowing insertion of the electronic paper 600 formed in the side portion thereof (right side in FIG. 13A), and is also provided with two sets of transport roller pairs 802a and 802b in the interior thereof. When the electronic paper 600 is inserted inside the main body unit 801 through the insertion port 805, the electronic paper 600 is placed in the main body unit 801 in a state of being pinched by the transport roller pairs 802a and 802b.

A rectangular hole portion 803 is formed in the display surface side of the main body unit 801 (front side of the paper surface in FIG. 13B) and a transparent glass plate 804 is fitted into the hole portion 803. In so doing, it is possible to view the electronic paper 600 in a state of being placed in the main body unit 801 from outside the main body unit 801. That is, the display surface in the display 800 is configured by the electronic paper 600 placed in the main body unit 801 being viewed through the transparent glass plate 804.

A terminal unit 806 is provided on the insertion direction tip portion of the electronic paper 600 (left side in FIG. 13A), and a socket 807 to which the terminal unit 806 is connected in a state in which the electronic paper 600 is placed in the main body unit 801 is provided in the interior of the main body unit 801. A controller 808 and an operation unit 809 are electrically connected to the socket 807.

In the display 800, the electronic paper 600 is placed in the main body unit 801 to be freely detachable, and may be carried and used in a state of being removed from the main body unit 801.

In the display 800, the electronic paper 600 is configured by the electrophoresis display device 920 as described above.

The electronic apparatus of the invention is not limited to application to those described above and examples include televisions, view finder-type or direct-view monitor-type video tape recorders, car navigation systems, pagers, electronic organizers, calculators, electronic newspapers, word processors, personal computers, workstations, video phones, POS terminals, and various electronic apparatuses provided with a touch panel, and the electrophoresis display device 920 can be applied the display unit of these various electronic apparatuses.

Above, although the electrophoresis dispersion liquid, the electrophoresis sheet, the electrophoresis device, and the electronic apparatus of the invention were described based on the embodiments shown in the drawings, the invention is not limited thereto and the configuration of each part may be changed to an arbitrary configuration having the same function. Other arbitrary configurations may be added to the invention.

The entire disclosure of Japanese Patent Application No. 2015-067724, filed Mar. 27, 2015 is expressly incorporated by reference herein.

What is claimed is:

1. An electrophoresis dispersion liquid, comprising:
   first electrophoretic particle of a scattering system having an ionic group on a surface thereof;
   second electrophoretic particle of a coloring system having a polarization group on the surface thereof; and
   a dispersion medium,
   wherein
   the ionic group is an acidic group, and further includes a ring structure that forms an acidic group and a salt,
   the first electrophoretic particle includes a scattering system particle having a first functional group on the surface thereof and a first block copolymer bonded to the scattering system particle, and
   the first block copolymer is formed by a first monomer having a site that contributes to dispersibility in the dispersion medium, a second monomer having the second functional group which has reactivity to the first functional group, and a third monomer having an acidic group and a ring structure being polymerized without the first monomer and the second monomer being copolymerized, and is connected to the scattering system particle by reacting the first functional group and the second functional group at the unit derived from the second monomer.

2. The electrophoresis dispersion liquid according to claim 1,
   wherein the dispersion portion at which the first monomer is polymerized, the bonding portion at which the second monomer is polymerized, and the ionic portion at which the third monomer is polymerized are connected in the first block copolymer.

3. The electrophoresis dispersion liquid according to claim 2,
   wherein the weight average molecular weight of the dispersion portion is 10,000 or more to 100,000 or less.

4. The electrophoresis dispersion liquid according to claim 2,
   wherein the bonding portion is formed by polymerizing two or more to ten or less of the second monomer.

5. The electrophoresis dispersion liquid according to claim 1,
   wherein the first monomer is a silicone macromonomer represented by the following general formula (I)

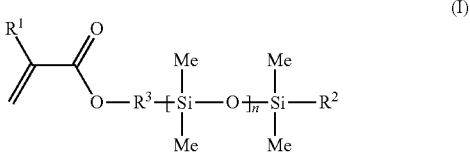

[in the formula. $R^1$ is a hydrogen atom or a methyl group. $R^2$ is a hydrogen atom or an alkyl group with 1 to 4 carbon atoms. $R^3$ is a structure including one type from an alkyl group with 1 to 6 carbon atoms and an ether group of ethylene oxide or a propylene oxide, and n is an integer of 0 or more].

6. The electrophoresis dispersion liquid according to claim 5,
wherein the molecular weight of the silicone macromonomer is 1,000 or more to 50,000 or less.

7. The electrophoresis dispersion liquid according to claim 1,
wherein the polarization group is an organic group having a main skeleton, and a substituent bonded to the main skeleton.

8. The electrophoresis dispersion liquid according to claim 7,
wherein the second electrophoretic particles include coloring system particle having a first functional group on the surface thereof, and a second block copolymer bonded to the coloring system particle; and
the second block copolymer is formed by a first monomer having a site that contributes to dispersibility in the dispersion medium, a second monomer having the second functional group which has reactivity to the first functional group, and a fourth monomer having an organic group being polymerized without the first monomer and the second monomer being copolymerized, and is connected to the coloring system particle by reacting the first functional group and the second functional group at the unit derived from the second monomer.

9. The electrophoresis dispersion liquid according to claim 8,
wherein the dispersion portion at which the first monomer is polymerized, the bonding portion at which the second monomer is polymerized, and the polarization portion at which the fourth monomer is polymerized are connected in the second block copolymer.

10. The electrophoresis dispersion liquid according to claim 1,
wherein the dispersion medium is silicone oil.

11. An electrophoresis sheet, comprising:
a substrate; and
a structure which is arranged above the substrate, and that accommodate the electrophoresis dispersion liquid according to claim 1.

12. An electrophoresis sheet, comprising:
a substrate; and
a structure which is arranged above the substrate, and that accommodate the electrophoresis dispersion liquid according to claim 2.

13. An electrophoresis device, comprising:
the electrophoresis sheet according to claim 11.

14. An electronic apparatus comprising:
the electrophoresis device according to claim 13.

15. An electrophoresis dispersion liquid, comprising:
first electrophoretic particle of a scattering system having an ionic group on a surface thereof;
second electrophoretic particle of a coloring system having a polarization group on the surface thereof; and
a dispersion medium,
wherein
the polarization group is an organic group having a main skeleton, and a substituent bonded to the main skeleton,
the second electrophoretic particles include a coloring system particle having a first functional group on the surface thereof, and a second block copolymer bonded to the coloring system particle, and
the second block copolymer is formed by a first monomer having a site that contributes to dispersibility in the dispersion medium, a second monomer having the second functional group which has reactivity to the first functional group, and a fourth monomer having an organic group being polymerized without the first monomer and the second monomer being copolymerized, and is connected to the coloring system particle by reacting the first functional group and the second functional group at the unit derived from the second monomer.

16. The electrophoresis dispersion liquid according to claim 15,
wherein the dispersion portion at which the first monomer is polymerized, the bonding portion at which the second monomer is polymerized, and the polarization portion at which the fourth monomer is polymerized are connected in the second block copolymer.

17. An electrophoresis sheet, comprising:
a substrate; and
a structure which is arranged above the substrate, and that accommodate the electrophoresis dispersion liquid according to claim 15.

18. An electrophoresis device, comprising:
the electrophoresis sheet according to claim 17.

19. An electronic apparatus comprising:
the electrophoresis device according to claim 18.

* * * * *